(12) United States Patent
Buhler

(10) Patent No.: US 11,610,137 B1
(45) Date of Patent: Mar. 21, 2023

(54) COGNITIVE COMPUTING USING A PLURALITY OF MODEL STRUCTURES

(71) Applicant: Paul Buhler, Mount Pleasant, SC (US)

(72) Inventor: Paul Buhler, Mount Pleasant, SC (US)

(73) Assignee: RKT Holdings, LLC, Detroit, MI (US)

( * ) Notice: Subject to any disclaimer, the term of this patent is extended or adjusted under 35 U.S.C. 154(b) by 687 days.

(21) Appl. No.: 16/549,940

(22) Filed: Aug. 23, 2019

Related U.S. Application Data

(60) Provisional application No. 62/722,037, filed on Aug. 23, 2018.

(51) Int. Cl.

| | |
|---|---|
| *G06F 16/245* | (2019.01) |
| *G06N 5/02* | (2023.01) |
| *G06N 20/00* | (2019.01) |
| *G06F 9/54* | (2006.01) |
| *G06F 16/21* | (2019.01) |

(52) U.S. Cl.
CPC ............... *G06N 5/02* (2013.01); *G06F 9/54* (2013.01); *G06F 16/212* (2019.01); *G06F 16/245* (2019.01); *G06N 20/00* (2019.01)

(58) Field of Classification Search
None
See application file for complete search history.

(56) References Cited

U.S. PATENT DOCUMENTS

| | | | |
|---|---|---|---|
| 10,375,143 B2 * | 8/2019 | Pevny | H04L 63/1425 |
| 10,576,620 B1 * | 3/2020 | Chou | A61F 5/0102 |
| 11,099,928 B1 * | 8/2021 | Vah | G06F 11/0793 |
| 11,289,208 B1 * | 3/2022 | Lippoff | G06F 9/547 |
| 11,312,003 B1 * | 4/2022 | Chou | A63B 71/1225 |
| 11,318,602 B1 * | 5/2022 | Chou | B25J 9/104 |
| 2018/0107501 A1 * | 4/2018 | Roth | H04L 67/02 |
| 2019/0278854 A1 * | 9/2019 | Newman | G06F 16/22 |
| 2021/0342490 A1 * | 11/2021 | Briancon | G06F 21/75 |
| 2022/0103439 A1 * | 3/2022 | Hutton | G06Q 10/067 |
| 2022/0335346 A1 * | 10/2022 | Subbiah | G06Q 10/0637 |

* cited by examiner

*Primary Examiner* — Kim T Nguyen
(74) *Attorney, Agent, or Firm* — Kilpatrick Townsend & Stockton LLP

(57) ABSTRACT

A method of populating a data set includes generating a plurality of models that model the behavior of an agent process, where the plurality of models includes a first model, a second model, and a third model. The method also includes using the plurality of models to generate one or more requests for one or more external data sources, and using the plurality of models to select a plurality of queries from a data store of predefined queries. The plurality of queries are selected by the plurality of models to request information that is missing from the data set. The method also includes populating at least a portion of the data set using information received in response to the one or more requests for the one or more external data sources and the plurality of queries.

20 Claims, 29 Drawing Sheets

| | A | B | C | D | E | F | G | H | I | J |
|---|---|---|---|---|---|---|---|---|---|---|
| 1 | What triggers this question? | Sub-Question #1 | Answer #1 | Sub-Question #2 | Answer #2 | Sub-Question #3 | Answer #3 | Sub-Question #4 | Answer #4 | Sub-Question #5 |
| 2 | | | | | | | | | | |
| 3 | | Does the client have at least a 24 month history of receiving the bonus income with their current employer? | | | | | | | | |
| 4 | | | | | | | | | | |
| 5 | | | Yes | All Products | | | | | | |
| 6 | | | No | | | | | | | |
| 7 | Client has bonus income | | | Does the client have at least a 12 month history of bonus? | | | | | | |
| 8 | | | | | Yes | | | | | |
| 9 | | | | | | Is the 12 month history in a similar line of work? | | | | |
| 10 | | | | | | | Yes | | | |
| 11 | | | | | | | | Has the client received a bonus from the current employer? | | |
| 12 | | | | | | | | | Yes | DU, LP, FHA |
| 13 | | | | | | | | | No | Does not qualify |
| 14 | | | | | | | | Does not qualify | | |
| 15 | | | | | No | Does not qualify | | | | |

FIG. 18

```
{
    "Option1": {
        "Text": "Can we use bonus income that has been received for less than 2 years with current employer?",
        "Question1": {
            "Text": "What is your loan product?",
            "Agency_Advantage": {
                "Question2": {
                    "Text": "Has the client received bonus income for at least the last 12 months?",
                    "Yes": {
                        "Answer": "This meets guidelines."
                    },
                    "No": {
                        "Answer": "There is no leeway. 12 months proof of receipt is required."
                    }
                }
            },
            "FHA": {
                "Question2": {
                    "Text": "Does the client have at least 12
```

FIG. 19

COGNITIVE COMPUTING USING A PLURALITY OF MODEL STRUCTURES

CROSS REFERENCE TO RELATED APPLICATIONS

This application claims priority to, and the benefit of, U.S. Provisional Application Ser. No. 62/722,037, filed on Aug. 23, 2018. The entire disclosure of which is incorporated by reference herein in its entirety.

TECHNICAL FIELD

This application discloses technology related to the fields of cognitive computing using various models to generate a sequence of queries.

SUMMARY

In some embodiments, a method of populating a data set may include generating a plurality of models that model the behavior of an agent process, where the plurality of models include a first model, a second model, and a third model. The method may also include using the plurality of models to generate one or more requests for one or more external data sources, where the one or more requests are associated with a first user. The method may additionally include using the plurality of models to select a plurality of queries from a data store of predefined queries, wherein the plurality of queries are selected by the plurality of models to request information that is missing from the data set. The method may further include populating at least a portion of the data set using information received in response to the one or more requests for the one or more external data sources and the plurality of queries.

In some embodiments, a system may include one or more processors and one or more memory devices including instructions that, when executed by the one or more processors, cause the one or more processors to perform operations including generating a plurality of models that model the behavior of an agent process, where the plurality of models may include a first model, a second model, and a third model. The operations may also include using the plurality of models to generate one or more requests for one or more external data sources, where the one or more requests may be associated with a first user. The operations may additionally include using the plurality of models to select a plurality of queries from a data store of predefined queries, where the plurality of queries may be selected by the plurality of models to request information that is missing from a data set. The operations may further include populating at least a portion of the data set using information received in response to the one or more requests for the one or more external data sources and the plurality of queries.

In some embodiments, a non-transitory, computer-readable medium may include instructions that, when executed by one or more processors, cause the one or more processors to perform operations including generating a plurality of models that model the behavior of an agent process, where the plurality of models may include a first model, a second model, and a third model. The operations may also include using the plurality of models to generate one or more requests for one or more external data sources, where the one or more requests may be associated with a first user. The operations may additionally include using the plurality of models to select a plurality of queries from a data store of predefined queries, where the plurality of queries may be selected by the plurality of models to request information that is missing from a data set. The operations may further include populating at least a portion of the data set using information received in response to the one or more requests for the one or more external data sources and the plurality of queries.

In any embodiments, any of the following features may be implemented in any combination and without limitation. The method/operations may also include storing a history of queries and information received in response to the queries for users other than the first user; identifying one or more patterns from the history of queries and information received in response to the queries; and using the one or more patterns to select the plurality of queries from the data store of predefined queries. The method/operations may additionally include altering a decision logic layer of the plurality of models based on the one or more patterns. The method/operations may further include clustering users based on whether the information received in response to the queries was accurate. The plurality of queries may be selected based on a role of a second user. The method/operations may also include determining, by the plurality of models, whether information received in response to the plurality of queries should replace information received in response to the one or more requests for the one or more external data sources in the data set. The plurality of queries may be selected based on an objective received from the first user. The first model may include a Business Process Modeling Notation (BPMN) model. The second model may include a Case Management Model and Notation (CMMN) model. The third model may include a Decision Model and Notation (DMN) model. A content API may be configured to receive topic codes and return query sets corresponding to each of the topic codes. A conversational API may be configured to manage a history of query sets and corresponding responses in one or more linked communication sessions.

BRIEF DESCRIPTION OF THE DRAWINGS

A further understanding of the nature and advantages of the present invention may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

FIG. 18 illustrates an encoding of the decision tree in a table format with specific questions/question sequences along with possible results.

FIG. 19 illustrates an XML encoding for the questions in the decision tree.

DETAILED DESCRIPTION

Described herein is a technology for generating queries through model-based cognitive computing. Before describing the novel technology of cognitive computing, this disclosure will discuss a cloud-based system coupled with an on-premises system, each of which can act as a requesting system for the resource verification server. The cloud-based system and the on-premises system described below are provided merely by way of example and are not meant to be limiting. FIGS. 1-6 describe such processes that may operate on such requesting systems. FIGS. 7-24 then describe the technology of the agent process using cognitive computing techniques.

Figure 1:
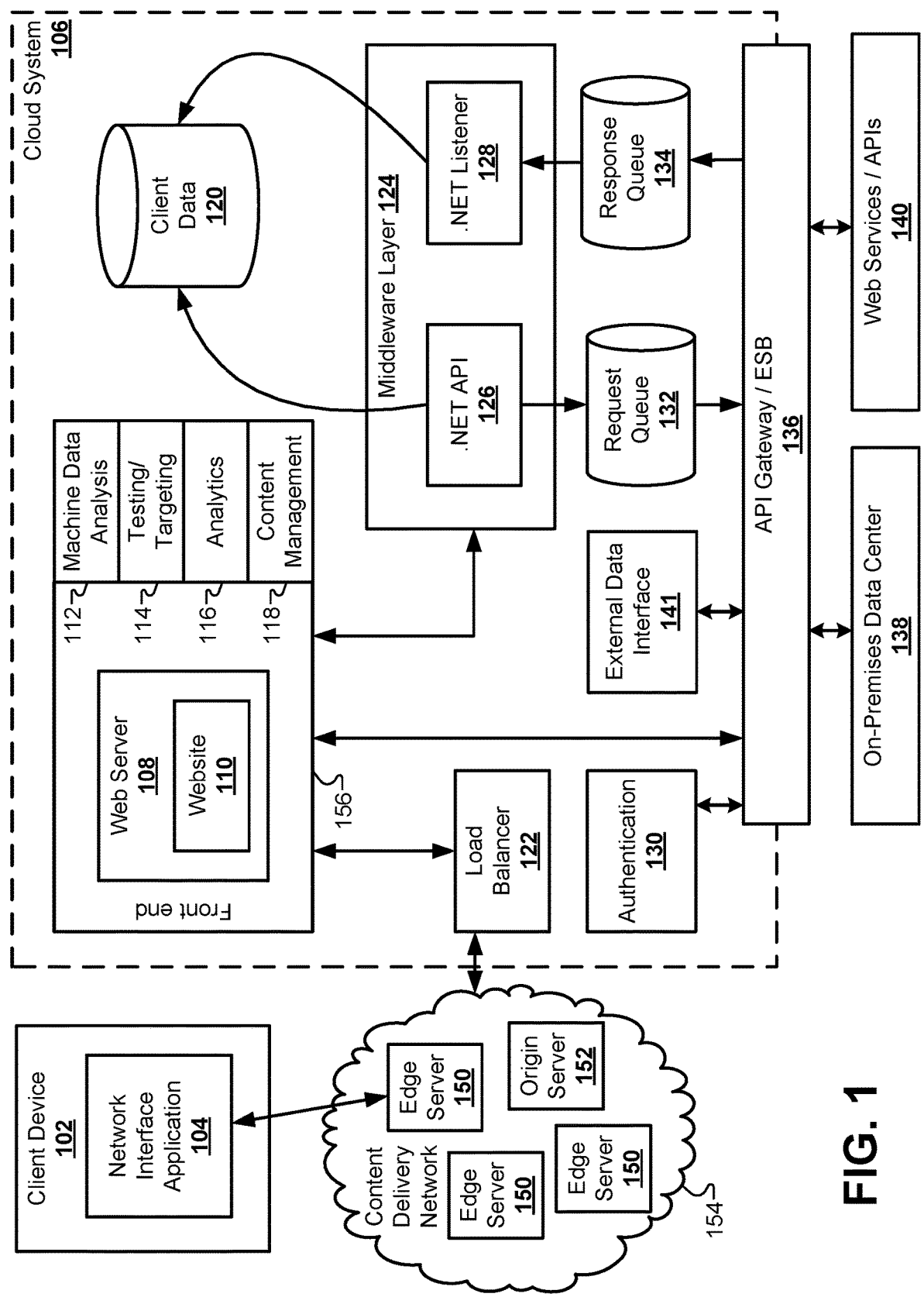
FIG. 1 illustrates a block diagram of a cloud system for receiving, importing, validating, and augmenting client data, according to some embodiments.

FIG. 1 illustrates a block diagram of a cloud system 106 for receiving, importing, validating, and augmenting client data, according to some embodiments. The client data collection process may begin with a client device 102 accessing the web server 108. The client device 102 may include a laptop computer, a desktop computer, a smart phone, a PDA, a tablet computer, a workstation, a voice-activated device or personal assistant, a watch, and/or the like. The client device 102 may be operated by a user to explore various data set options that may be available through the cloud system 106. The client device 102 may include a software application that acts as a network interface application 104 to parse and display data sent from the web server 108 and send information from the user. Depending on the particular hardware of the client device 102, the network interface application 104 may include a web browser operating on a desktop computer, an app operating on a smart phone, a voice recognition application operating on a control device, including the Google Home® or the Amazon Alexa®.

The client device 102 may communicate through a network, such as a local area network (LAN), a wide-area network (WAN), the Internet, and so forth. In the embodiment of FIG. 1, the cloud system 106 may provide content to the network interface application 104 via a content delivery network (CDN) 154. The CDN may include a plurality of edge servers 150 and at least one origin server 152 to store and distribute cached copies of the website 110 provided by the web server 108. The website 110 may include programming code, such as JavaScript, that provides front-end functionality to the website 110 when interacting with the client device 102. For example, the website 110 can collect client data that may be used to generate a result set by walking the user through a series of web forms. The client data may include information descriptive of the user, such as identification numbers. The website 110 can also use information supplied by the client device 102 to solicit information from third-party services through various APIs and/or web service interfaces. An example of a progression of web forms that collect information needed to recommend and/or approve a result set for the user is described in greater detail below. The client data may be provided in one or more data packets transmitted from the client device 102.

The CDN 154 can provide local copies of the website 110 to the client device 102 from an edge server 150 that is closer in proximity to the client device 102 than the web server 108 itself. One of the problems solved by the embodiments described herein involves the speed with which result sets can be provided and updated on the display of the client device 102. The architecture illustrated in FIG. 1 is specifically designed to increase the speed with which these results can be displayed on the client device 102 from a hardware perspective.

The website 110 is used only as an example of one of the ways that the cloud system 106 can interact with the client device 102. Therefore, this disclosure should not be limited to a website per se. Instead, the term website 110 throughout this disclosure may be replaced with any user interface capable of receiving data from the client device 102 and transmitting data to the client device. For example, another embodiment can provide a voice activated, audio interface for communicating with client devices through voice services such as Alexa® by Amazon®. Another embodiment can use an entertainment dashboard in a vehicle as an interface for communicating with the client device 102. Similarly, the web forms presented through the website 110 are also used as an example that is specific to the website 110 environment. In this disclosure, the term web form may be replaced with any sort of digital form that can present and receive information to a user through the network interface application 104. For example, the form could include interactive user interface elements displayed in an application running on a smart phone or smart watch. In another example, the form may include audio provided to a user and audio received from a user in a voice-activated user interface. Therefore, the terms "website" and "web form" are merely exemplary and not meant to be limiting.

The cloud system 106 may include a load balancer 122 that receives Internet traffic that may include client data provided from the client device 102. As used herein, the term "client data" may include any information received from the client device 102. For example, client data may include numerical values, data fields, estimates, identification numbers, addresses, user account identifiers, and so forth. As described in greater detail below, the client data received from the client device 102 may be augmented with information received from third-party web services and/or application programming interfaces (APIs). The client data may also be verified or validated using third-party validation interfaces that are external to the cloud system 106.

The cloud system 106 may include hardware elements that may be electrically coupled via a bus. The hardware elements may include one or more central processing units (CPUs), one or more input devices (e.g., a mouse, a keyboard, etc.), and one or more output devices (e.g., a display device, a printer, etc.). The cloud system 106 may also include one or more storage devices. By way of example, storage device(s) may be disk drives, optical storage devices, solid-state storage device such as a random access memory ("RAM") and/or a read-only memory ("ROM"), which can be programmable, flash-updateable and/or the like.

The cloud system may additionally include a computer-readable storage media reader, a communications system (e.g., a modem, a network card (wireless or wired), an infra-red communication device, etc.), and working memory, which may include RAM and ROM devices as described above. In some embodiments, the cloud system 106 may also include a processing acceleration unit, which can include a DSP, a special-purpose processor and/or the like.

The computer-readable storage media reader can further be connected to a computer-readable storage medium, together (and, optionally, in combination with storage device(s)) comprehensively representing remote, local, fixed, and/or removable storage devices plus storage media for temporarily and/or more permanently containing computer-readable information. The communications system may permit data to be exchanged with the network and/or any other computer described below with respect to the cloud system 106.

The cloud system 106 may also comprise software elements, shown as being currently located within a working memory, including an operating system and/or other code, such as an application program (which may be a client application, web browser, mid-tier application, RDBMS, etc.). It should be appreciated that alternate embodiments of a cloud system 106 may have numerous variations from that described above. For example, customized hardware might also be used and/or particular elements might be implemented in hardware, software (including portable software, such as applets), or both. Further, connection to other computing devices such as network input/output devices may be employed. Software of cloud system 106 may include code for implementing various embodiments as described herein.

The Web server 108 may be part of a front end 156 posted by the cloud system 106. The front end 156 may additionally include other hardware and/or software components that quantify the performance of the Web server 108. Some embodiments may include a content management system (CMS) 118 to support the creation and/or modification of digital content that is presented by the Web server 108 to the client device 102. Some embodiments may include an analytics component 116, such as a customer experience management (CEM) system that captures and analyzes the details of the experience of the user of the client device 102. Some embodiments may include a testing and targeting component 114 used to target specific users with specific content. Some embodiments may also include a machine data analysis component 112 that searches, monitors, and analyzes machine-generated big data via a web interface by capturing/indexing/correlating real-time data in a searchable repository to generate reports, graphs, and other visualizations. These components 112, 114, 116, 118 can be used by the cloud system 106 to analyze the effectiveness of the content provided by the website 110 over time.

The cloud system 106 may also include a middleware layer 124 that acts as an interface between the front end 156 and other data systems in the cloud system 106. The middleware layer 124 may perform application integration, data integration, and handle messages passed back and forth between the cloud system 106 and an on-premises data center 138 and other external systems. In the embodiment of FIG. 1, the middleware layer 124 may include an API 126 and a listener 128 for generating and receiving responses from various systems. For example, the middleware layer 124 can communicate with a client data database 120 that securely stores client data received from the client device 102. The client data database 120 can be used in conjunction with other off-cloud databases to store client data between web sessions for a particular user. The middleware layer 124 can also interface with a request queue 132 and a response queue 134 of the cloud system 106. The request queue 132 can store messages passed from the middleware layer 124 to other systems both inside and outside the cloud system 106. Similarly, the response queue 134 can receive messages passed from other systems to the middleware layer 124.

Some of the external systems that interface with the cloud system 106 may include the on-premises data center 138 and one or more Web services and/or APIs 140. To interface with these external systems, the cloud system 106 may include an API Gateway or Enterprise Service Bus (ESB) to provide a central point for managing, monitoring, and accessing exposed Web services. Data can be passed from the middleware layer 124 to the API Gateway/ESB 136 through the request queue 132 and/or the response queue 134. Additionally, the front end 156 may communicate directly with the API Gateway/ESB 136.

To collect the client data from the client device 102, the website 110 may present a series of dynamic web forms to the network interface application 104. Before, during, and/or after this process of collecting client data begins, the cloud system 106 may require the user to establish a user account with the cloud system 106. Some embodiments may include an authentication module 130 that authenticates an identity of a user of the client device 102. The authentication module 130 may communicate with the data center 138 through the API Gateway/ESB 136.

The presentation of web forms may include a type of web form that allows the client device 102 to submit data provided by the user. The web form can receive data from the user that may require some form of verification before it is used in the selection of a data set or the generation of a result set. Prior to this disclosure, such data verification could take days or even weeks to perform. This generally discouraged users from completing the web session and generating a client data packet. To solve this and other problems, the embodiments described herein may use an external data interface 141 to verify the client data provided from the client device 102. The external data interface 141 may, for example, retrieve a history of data values from other computer systems that can be used to generate an estimate of certain fields in the web form provided by the user. For example, the external data interface 141 may provide a verified value to the cloud system 106, and the data provided from the client device 102 may be verified if that data falls within a predetermined range of the verified value. This data verification step allows for greater accuracy and reliability when selecting candidate data sets and generating result sets for the client device 102.

The external data interface 141 may also retrieve data that can be used to supplement and/or correct information provided from the client device 102. Depending on the complexity of the web session, some users may be unwilling to manually enter all of the client data requested by the website 110. Other users may enter incorrect information accidentally or purposefully. The external data interface 141 provides an alternative to previous systems that required the user to manually provide all current data through the client device 102. Instead, the external data interface 141 can select at least a portion of the current data provided to the web form to automatically download a portion of the current data from the external data interface 141. For example, instead of manually typing current data values into the web form, the cloud system 106 can instead use a user identifier and/or user credentials to download a portion of the current data automatically through the external data interface 141. This process can decrease the amount of time required for the user to progress through the plurality of web forms, and can reduce user-injected errors into the client data. Information may be imported from the external data interface 141 as data packets. The external data interface 141 may access a third-party computer system that provides the imported data. After the client data is collected from the client device 102 and optionally supplemented/verified by data from the external data interface, the system can use the client data to generate a solution that includes one or more result sets.

Figure 2:
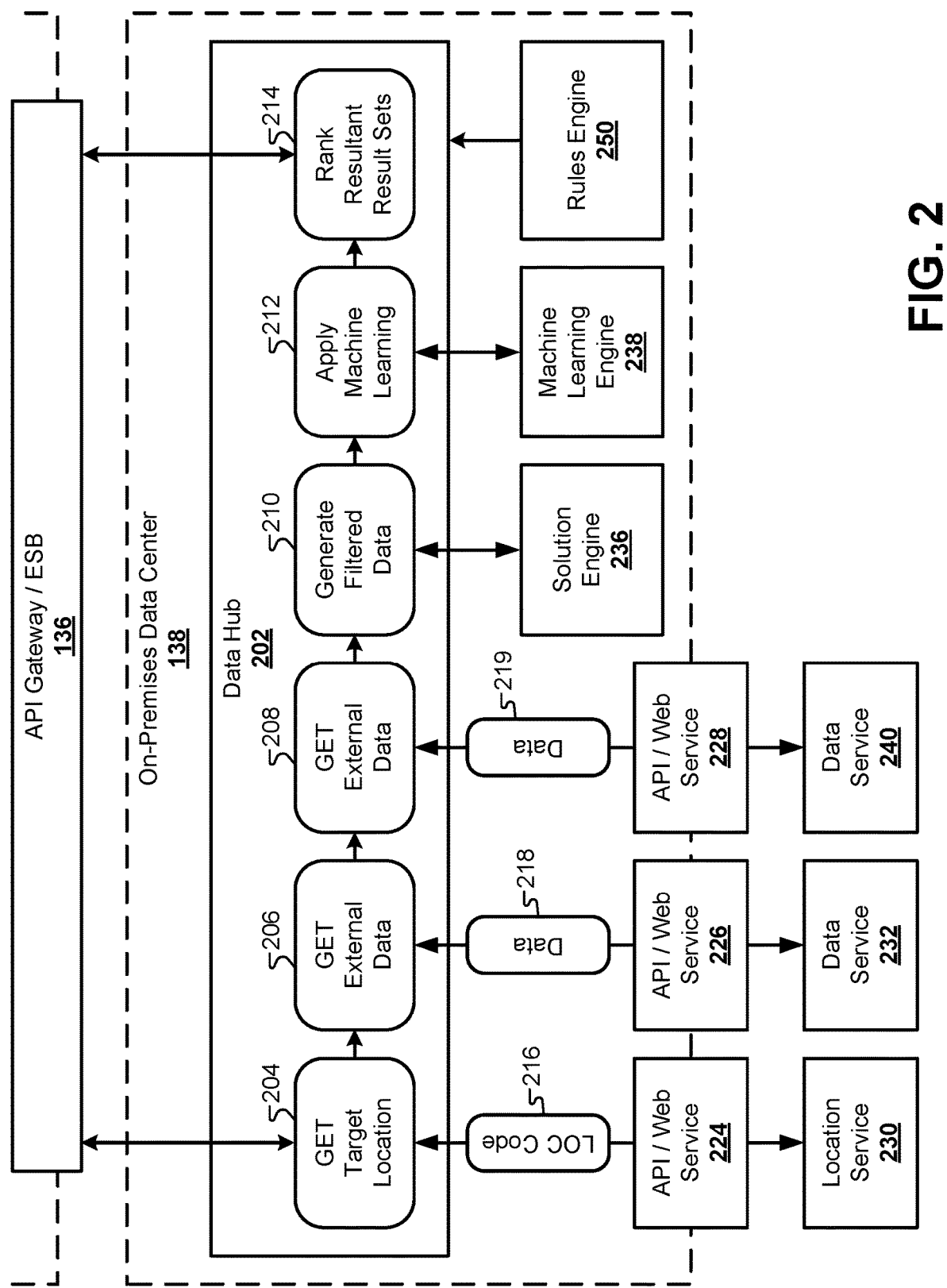
FIG. 2 illustrates a block diagram of a data center that may be used in conjunction with the cloud system, according to some embodiments.

FIG. 2 illustrates a block diagram of a data center 138 that may be used in conjunction with the cloud system 106, according to some embodiments. In this embodiment, the cloud system 106 may be separate from the data center 138. For example, the data center 138 may be physically hosted by an entity that generates the result sets to the client device 102, while the cloud system 106 may be hosted by a cloud service provider that is different from the entity providing the data center 138. However, in other embodiments, the functionality provided by the data center 138 may also be located in the cloud system 106. Some embodiments may duplicate the functions described below for the data center 138 in both the cloud system 106 and the data center 138. Therefore, the bifurcation of the system between FIG. 1 and FIG. 2A is done by way of example and not meant to be limiting. Other embodiments may divide the functionality described herein between the cloud system 106 and the data center 138 in any combination of functions without limitation. In another embodiment, the architecture of FIG. 2 may have the software/hardware components from the data center 138 instead located in the cloud system 106.

The data center may include various databases that store client data, along with systems that provide content for the cloud system 106. To generate solutions based on the received client data, the data center 138 may include a data hub 202 that receives a packet of client data from the cloud system 106 and generates one or more result sets that are transmitted back to the cloud system 106. The data hub 202 may act as a central accumulator of the client data that finalizes the client data packet for generating a solution. Specifically, the data hub 202 may be made up of a plurality of processes that augment, format, filter, and process the client data in such a way that a solution engine 236 and a machine learning engine 238 can generate an optimal result set.

In some embodiments, the data hub 202 can augment the client data by executing a process 204 that requests a location code 216 from a location service 230 through an API/web service 224. The location code may designate a general geographic area to be associated with the client data. The data hub 202 may also include a process 206 that uses the location code retrieved from the location service 230 to retrieve rules or penalties 218 that may be applied to the candidate data sets based on location. The process 206 can send the location code through an API/web service 226 to a data service 232 specifically configured to provide such rules or penalties 218 for candidate data sets. These may include a cost that is applied to the data set based on the location from the location service 230. In some embodiments, a process 208 may retrieve additional data 219 from a data service 240 through an API/web service 228. The data 219 received from the data service 240 may include a rating for the user that may influence which particular candidate data sets that may be available to the user. The data service 240 may include a third-party service that provides a rating for the user that is based at least in part in some of the values provided in the client data from the user, as well as a previous history of the user.

After augmenting the client data, the data hub 202 can include a process 210 to generate a set of filtered data. As used herein, the term filtered data may refer to a specific subset of the augmented client data that is formatted for submission to the solution engine 236. The filtered data can be used by the solution engine 236 to filter out candidate data sets from a collection of available data sets that are not available to the user. For example, at this stage, the client data may include an exhaustive list of information that may be needed later by the system in future web sessions. However, much of the client data may not be needed at this stage of the process for filtering the collection of available data sets. Therefore, the process 210 can select a subset of the information in the client data, format the filtered data accordingly, and send the formatted subset of the client data to the solution engine 236. In response, the solution engine can provide a plurality of candidate data sets from the collection of available data sets for consideration by the data hub 202.

Next, the data hub 202 can select one or more optimal data sets from the plurality of candidate data sets through a process 212 that accesses a machine learning engine 238. The machine learning engine 238 can use additional information from the filtered and/or client data. For example, the solution engine 236 may provide a plurality of data sets that are available to the user based on the filtered client data. The machine learning engine 238 can select an optimal subset of the available data sets to be transmitted back to the client device 102. A process 214 can then rank the result sets by type and send the result sets to the cloud system 106 for transmission to the client device 102.

The data hub 138 may govern the overall process of collecting the client data, determining which, if any, portions of the client data are missing or invalid, and calling upon external services to augment the client data with additional information. For each field in the client data, a rules engine 250 can execute a validation rule to ensure that the client data is valid (e.g., "is the value of the rate field greater than 0.00?"). The rules engine 250 can also determine which external data services may be used to retrieve data that is missing from the client data packet. For example, a rating from an external rating service may be required before candidate data sets can be selected. If the rules engine 250 determines that the client data set is missing this rating, it can cause the process flow of the data hub 202 to make a request to the external rating service to retrieve a rating for the user. Overall, the rules engine 250 can orchestrate the process flow of the different processes 204, 206, 208, 210, 212, 214, etc., in the data hub 202.

Figure 3:
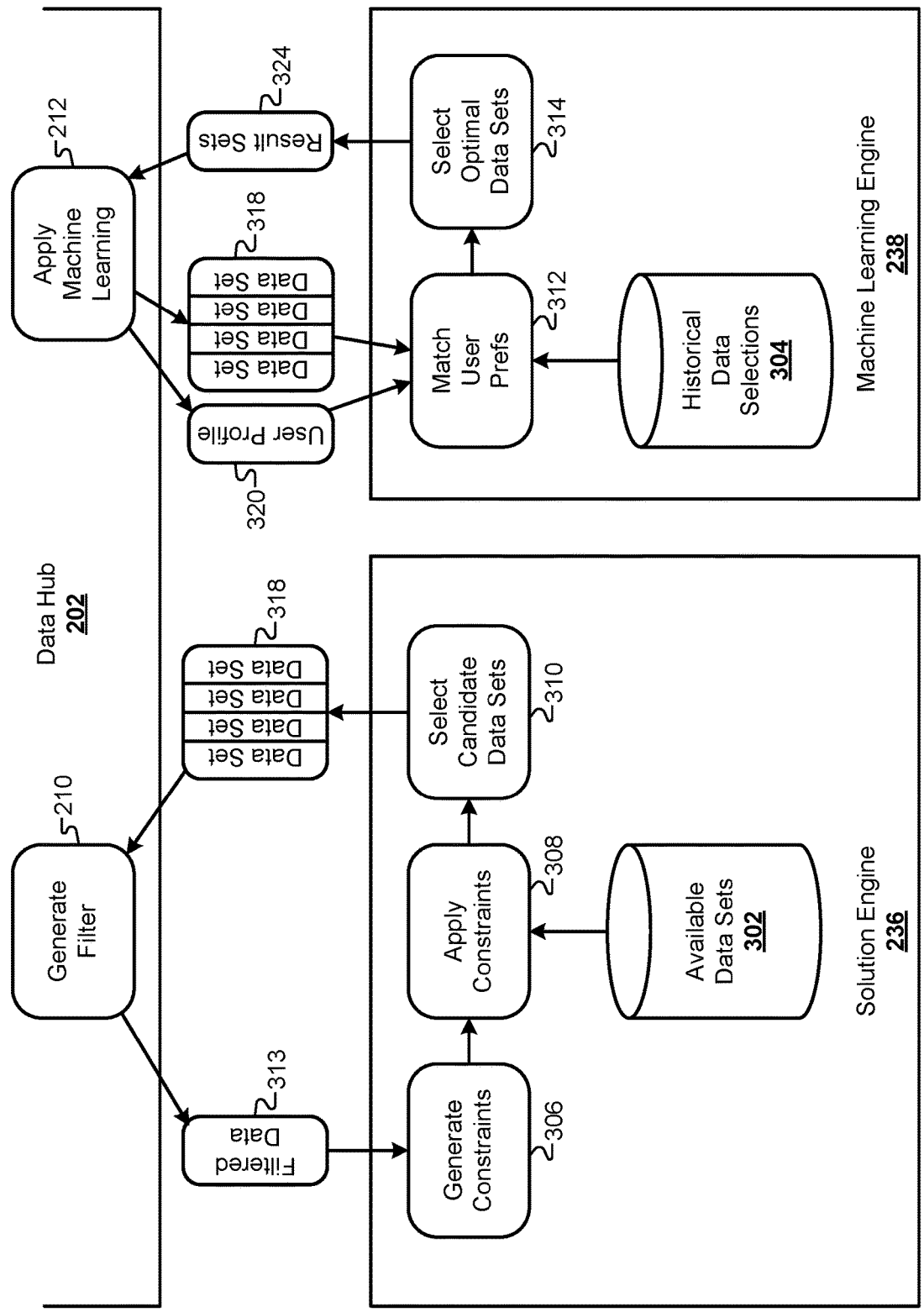
FIG. 3 illustrates a block diagram of how the solution engine and the machine learning engine generate result sets, according to some embodiments.

FIG. 3 illustrates a block diagram of how the solution engine 236 and the machine learning engine 238 generate result sets 324, according to some embodiments. The filtered data 313 can be passed to the solution engine 236, and process 306 can use the filtered data 313 to generate a plurality of rules and subsequent constraints to be applied to the available data sets. As described in greater detail below, the process 306 can use fields in the filtered data 313 to eliminate subsets of the available data sets, which can be expressed in constraints statements. For example, a determined data type may be used to eliminate certain data sets from the collection of available data sets. In some embodiments, the collection of available result sets may be categorized according to a type that may correspond to the data type in the filtered data 313. One or more constraint expressions may be constructed by the process 306 that would eliminate available data sets associated with that particular data type from the collection of available data sets for this particular set of filtered data 313.

After generating the constraints, the solution engine 236 can execute a process 308 that applies the constraint statements to the collection of available data sets. The collection of available data sets may be stored in a database 302, and may include thousands of different data set options. Data sets may be categorized based on a time interval, a rate, a source, and so forth. Data sets may also be categorized based on eligibility of the user based on augmented client data. In some embodiments, the constraint expressions can be applied in a single pass to each individual available data set; however, other embodiments may apply constraint expressions in multiple passes through the available data set. After the constraints are applied, a linear regression method 310 can be used to generate a set of candidate data sets 318. These candidate data sets may represent data sets for which the user may be eligible.

Next, the candidate data sets 318 can be provided to the machine learning engine 238. The machine learning engine can analyze the candidate data sets 318 and select one or more optimal data sets 314 from the candidate data sets 308. The machine learning engine 238 can use a collection of historical data selections 304 to determine the optimal data set(s) 314. For example, the client data provided by the user may be used to generate a user profile. The machine learning engine 238 can compare the user profile for this particular user to user profiles for previous web sessions associated with different users. The data set selections of previous users can then be used to determine which of the candidate data sets 318 would most likely be chosen by the current user.

For example, after each web session, the machine learning engine 238 can store the optimal data sets presented to each user, along with which of the optimal data sets was selected by each user in the collection of historical data selections 304. Additionally, the machine learning engine 238 can store the user profile derived from the augmented client data for each user with the selection information. When a new plurality of candidate data sets 318 is received for a new user, the augmented client data can be used to generate a similar user profile. For example, a set of values can be extracted from the augmented client data to generate a user profile 320. The user profile 320 can be matched to one or more historical user profiles. The final selections made by the users associated with the matched historical profiles can then be used to influence the selections made from the candidate data sets 318 for the current user. For example, if a number of previous users all selected certain types of optimal data sets that were presented, the previously selected optimal data sets can be ranked higher, based on this prior selection data. In essence, the machine learning engine 238 may use the expressed preferences of previous users to determine which of the candidate/optimal data sets are most likely to be selected by the current user.

Figure 4:
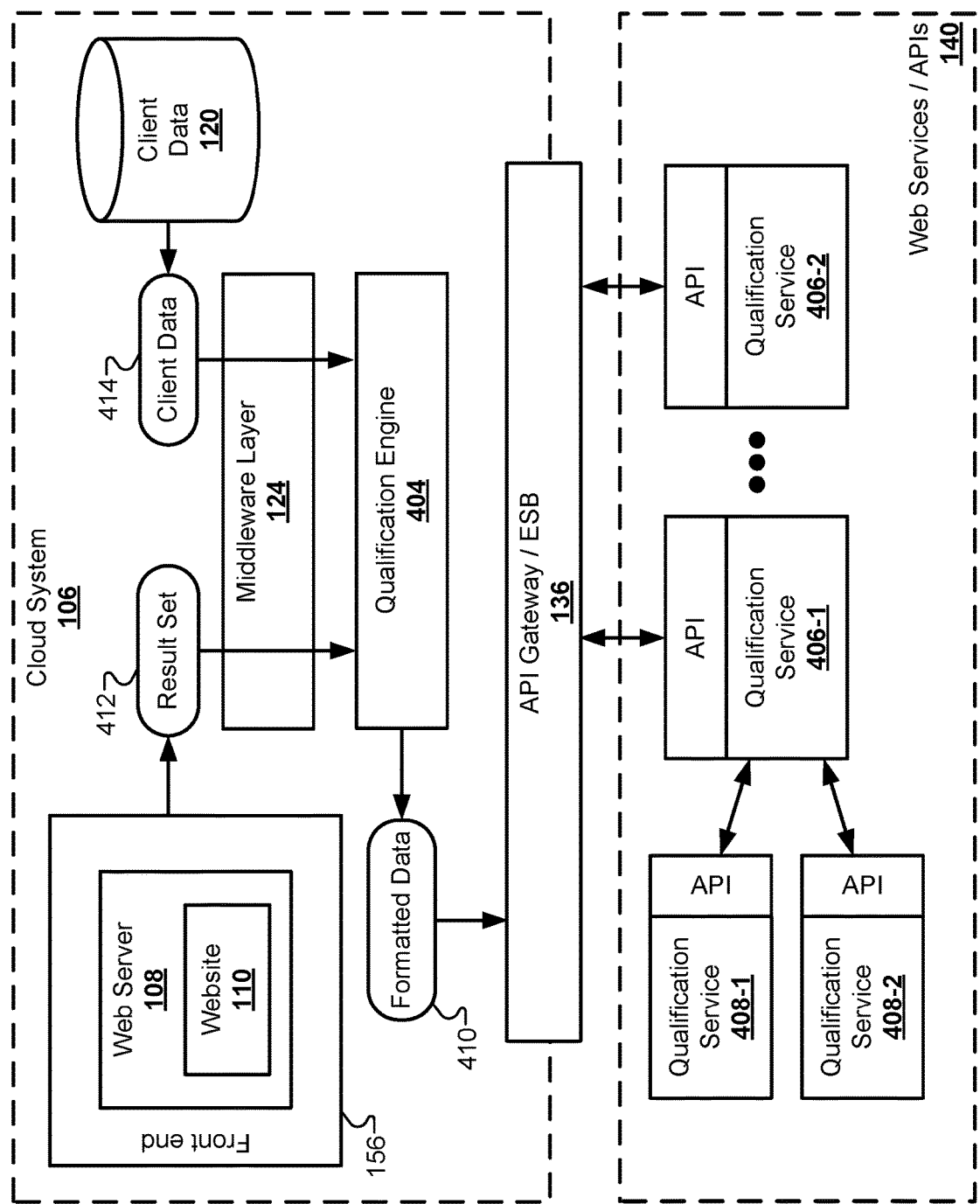
FIG. 4 illustrates a block diagram of the cloud system interacting with a plurality of qualification services, according to some embodiments.

FIG. 4 illustrates a block diagram of the cloud system 106 interacting with a plurality of qualification services 406, according to some embodiments. After the user has finalized the result set by adjusting values in the result set 324 through the web interface, the finalized result set 412 can be sent to a universal qualification engine 404 of the cloud system 106. The finalized result set 412 may include final values for the adjustable parameters that are set by the user, such as a final value for a rate field, a final value for a cost or penalty field, a final value for a time interval field, and so forth. Additionally, the client data that was collected, imported, augmented, and validated during the process described above may be stored in the client data database 120. The client data 414 may also be provided to the qualification engine 404.

After receiving the finalized rule set 412 and the client data 414, the qualification engine 404 can filter and/or combine data fields from the finalized result set 412 and the client data 414 to put together specific data packages that are required by each of the qualification services 406. Each qualification service 406 may require certain data points from the finalized result set 412 and/or the client data 414, and the qualification engine 404 can assemble data packages that match the requirements of each particular qualification service 406. Additionally, each qualification service 406 may require that each data packet be formatted according to specific requirements, such as a specific XML file format. The qualification engine 404 can format each data package according to the requirements of each particular qualification service 406.

Through the API Gateway/ESB 136, the qualification engine 404 can send data packages to one or more of a plurality of qualification services 406. Some qualification services 406 may be communicated with directly by the cloud system through a corresponding public API or web service interface. Secondary qualification services 408 may be accessible through another qualification service 406-1. In these cases, the data package can be formatted and selected based on the requirements of the qualification service 406-1, and a field or designator may be provided indicating that the qualification service 406-1 should send the request to a specific secondary qualification service, such as qualification service 408-2.

In some cases, each qualification service 406 may impose a penalty or cost on each submitted request. Therefore, it may be advantageous for the cloud system 106 to intelligently determine an order of precedence or ranking for the qualification services 406. When a plurality of qualification services are available, the cloud system 106 can rank each of the qualification services based on the criteria discussed below, then sequentially send requests to each of the qualification services 406 until an acceptable result has been returned. In some embodiments, the request may be sent simultaneously to each of the qualification services 406 without regard for a specific penalty for each. Instead, the system can analyze the results from each of the qualification services 406 to determine which of the results is most advantageous.

Figure 5:
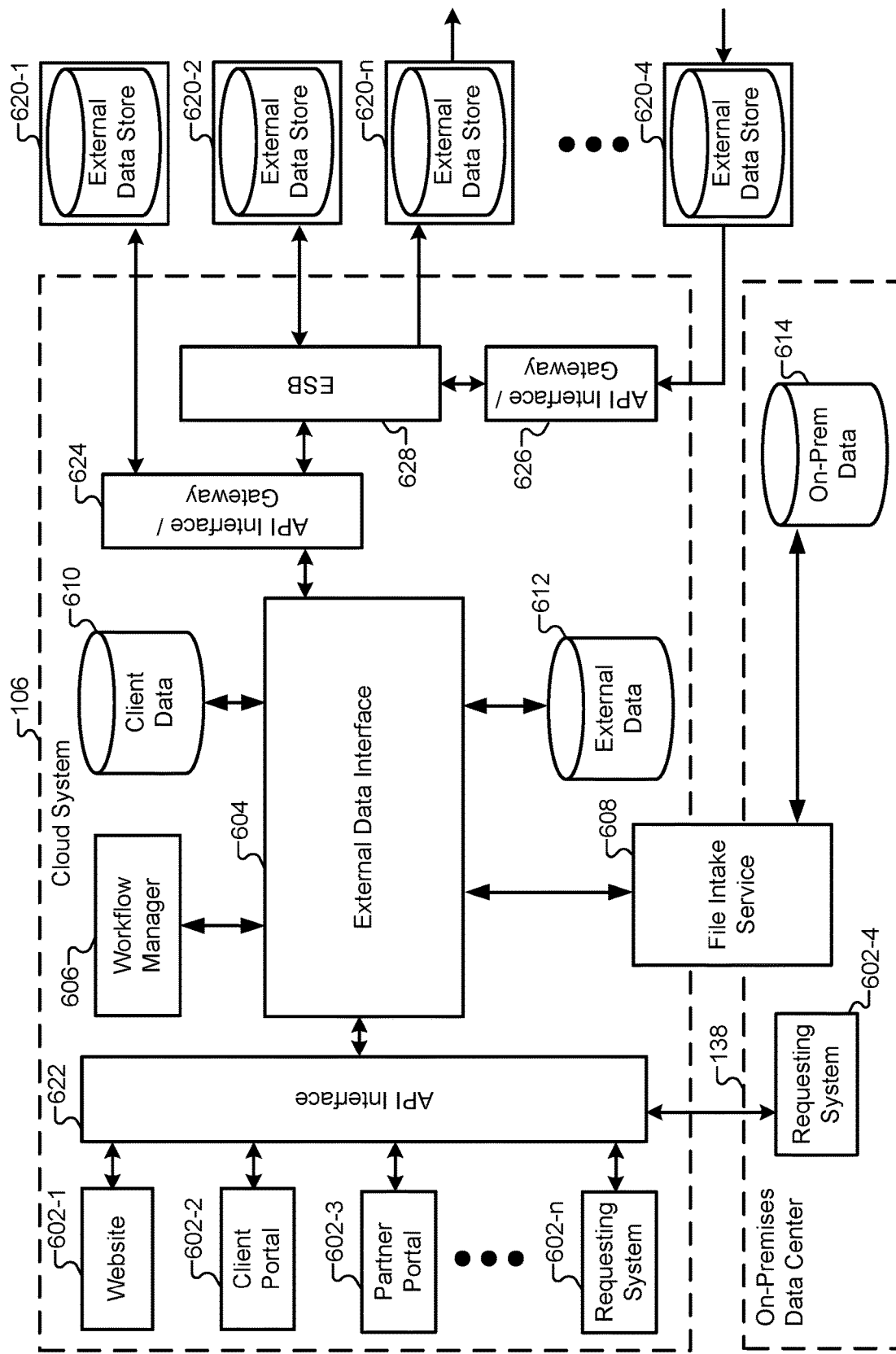
FIG. 5 illustrates an external data interface in the cloud system that can be used for extracting information from external data stores, according to some embodiments.

FIG. 5 illustrates an external data interface 604 in the cloud system 106 that can be used for extracting information from external data stores, according to some embodiments. As described above, the cloud system 106 may include a website 602-1. The website 602-1 can be used to initially collect information from the client device to begin the process described above. However, the website 602-1 may be just one of a plurality of possible requesting systems 602. These requesting systems 602 may include a client portal 602-2 allows client devices to access and edit their data sets after the process described above in FIGS. 1-4 to generate a final result set has been completed. The requesting systems 602 may also include a partner portal 602-3 that is a partner-facing web application used to feed client data to other systems. Some of the requesting systems 602 may be part of the same cloud system 106 as the external data interface 604. Alternatively or additionally, some of the requesting systems 602 may be part of the on-premises data center 138, such as requesting system 602-4. In other embodiments not explicitly shown in FIG. 5, some requesting systems 602 may also reside in other computing locations.

Together, the requesting systems 602 may be referred to herein as "internal" systems, in that they are internal to the cloud system 106 and/or the on-premises data center 138. This terminology can be used to differentiate the internal systems from the "external" data stores 620 that are being accessed. In some embodiments, the internal systems may all be operated by the same entity, whereas the external data stores 620 may each be operated by different entities. The internal systems also may be used for editing or collecting client device data from the client device for the process described above in FIGS. 1-4, whereas the external systems are used to supplement or verify information provided by the client device.

An API interface 622 may also be provided in the cloud system 106 to both identify and filter the requesting systems 602 (the internal systems) making requests, and to provide a uniform interface for each type of call that may be made to one of the external data stores 620. The API interface 622 can whitelist and/or blacklist any systems making a request. In some embodiments, each of the requesting systems 602 can be included on a whitelist such that no external systems can make calls through the API interface 622. In some embodiments, the API interface 622 can standardize the format for requests made to any external data store 620 using, for example, a REST interface. For example, POST or GET commands received through the API interface 622 can be used to extract data sets for single client identifiers, as well as batches of multiple data sets for multiple client identifiers.

In other embodiments, the API interface 622 may include a specified format for each subset of external data stores 620 that provide similar functions, provide similar services, and/or store similar data. For example, external data stores 620-1, 620-2 may each similarly provide a certain type of data that can be used to supplement client data in the same way. One function of the external data interface 604 and the API interface 622 is to abstract the details of selecting between all of the external data stores 620 to find the right subset of external data stores that can service the request from the client device, as well as selecting one of the subset of external data stores that can optimally service the request. Therefore, the API interface 622 may include standardized interfaces (e.g., POST/GET) for accessing similar types of data. When a command is received through the API interface 622, the external data interface 604 can determine the subset of external data stores 620 that are capable of servicing the request by virtue of the type of call received through the API interface 622. Each call that is specific to a subset of the external data stores may include parameters that are needed to access the corresponding subset of external data stores 620.

As will be described below in detail, the external data interface 604 can receive requests from the API interface 622 and proceed to check a localized cache for previous results, build a full request using stored client device data, select a single external data store from the identified subset of external data stores, and package the request in a format specific to the selected external data store. The cloud system 106 may include a client data store 610 that includes information received from the client devices, such as identification information that can be used to uniquely identify the user of the client device, and which can be used by the external data interface 604 to complete otherwise incomplete requests received through the API interface 622. The cloud system 106 may also include a database for external data 612 that has been previously extracted from the external data stores 620. The database for external data 612 can be used to service requests to the external data interface 604 without making an additional call to the external data stores 620 in certain situations described below.

After results are received from the external data stores 620, the external data interface 604 can store and analyze these data for future processes. A file intake service 608 may have portions that reside both in the cloud system 106 and in the on-premises data center 138. The file intake service 608 can receive data and documentation from the external data stores 620 and encrypt and transfer them to an on premises data store 614. The external data interface 604 can also perform certain evaluations to analyze the data received from the external data stores 620. In some cases, this analysis may verify information previously provided from the requesting systems 602 or augment the client data with information that has not yet been provided from the requesting systems 602. These evaluations may interface with a workflow manager 606 to both add and remove tasks specific to a particular client data set.

It will be appreciated that each of the external data stores 620 may include a web service interface or other standard API that includes formats or parameters that are very specific to each individual external data store 620. Therefore, before sending a request, the cloud system 106 may need to perform extensive formatting and repackaging of a request received through the API interface 622 before it is sent to the external data stores 620. One of the benefits provided by the system described herein is that the API interface 622 provides a standardized and stable interface for each of the requesting system 602 to make requests. As the web service interfaces of each of the external data stores 620 change over time, the external data interface 604 can be changed centrally to match the interfaces of the external data stores such that the requesting systems 602 are isolated from these changes. Put another way, the external data interface 604 and its surrounding APIs abstract the details of interfacing directly with the external data stores 620 from each of the requesting systems 602. Furthermore, when multiple external data stores 620 offer similar services, the external data interface 604 can abstract the process of determining which subset of the external data stores 620 are capable of servicing the request, as well as selecting one of the subset of external data stores 620 for servicing a particular request.

The process of formatting and packaging a request for the external data stores can be distributed between the external data interface 604, an API interface/gateway 624, and an Enterprise Service Bus (ESB) 628. The external data interface 604 may use a high-level programming language, such as C # or C++. Complex mappings between the data received from the API interface 622 and the required formats of the external data stores 620 can be performed in the external data interface 604, such as initially populating the request data fields and performing data transformations. Other lower-level mappings can be performed in the ESB 628, such as simple conversions between standardized formats (e.g., XML and JSON). The ESB 628 can also provide a second layer of security by whitelisting/blacklisting systems such that only the external data interface 604 and other approved systems can make calls through the ESB 628 to the external data stores 620.

Another API interface/gateway 626 can be used for synchronous calls to external data stores 620. For example, each external data store 620 may have different session characteristics, including a session timeout interval. For some external data stores 620-4 that require a longer session (e.g., 90 seconds) to service requests, the API interface/gateway 626 can handle the timing and handshakes between the external data store 620-4 and the cloud system 106. For example, the external data store 620-4 may interface with another external system and act as a middleman between the external system and the cloud system 106. This may require a longer session interval while the external data store 620-4 interacts with the external system.

Figure 6:
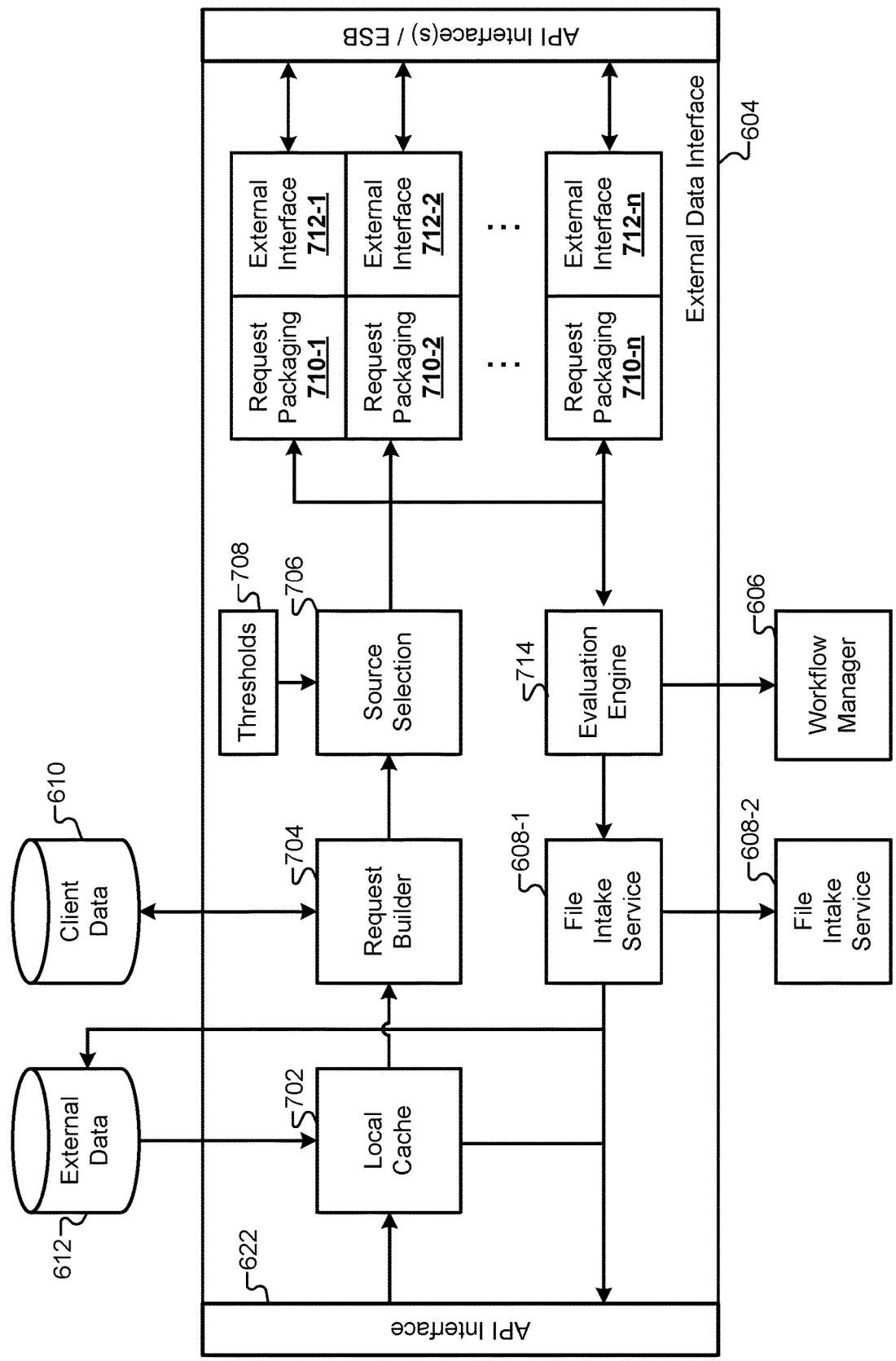
FIG. 6 illustrates a simplified block diagram of the external data interface, according to some embodiments.

FIG. 6 illustrates a simplified block diagram of the external data interface 604, according to some embodiments. After receiving the request through the API interface 622, the external data interface 604 can determine a type for the request. The type may be determined based on a particular call made through the API interface 622. For example, functions performed by the external data interface 604 may be associated with particular calls through the API interface 622. The external data interface 604 can receive a call and look up a subset of external data stores 620 that are capable of servicing the particular request type. Note that multiple calls may be made through the API interface 622 for the same subset of external data stores 620, such as both a GET and a POST call for a single functionality to service single and batch requests, respectively.

After receiving the request, and before accessing any of the external data stores 620, the external data interface 604 can execute a local cache function 702 that checks the database of external data 612 to determine whether the request can be serviced locally. The database of external data 612 can store data previously received from the plurality of external data stores 620. This can be useful for servicing duplicate requests where the resulting data sets have been recently retrieved from the plurality of external data stores 620.

If the local cache process 702 determines that a call needs to be made to the external data stores 620, the request can be forwarded to a request builder 704. The request builder can determine whether the information provided in the request is sufficient for the selected external data store to service the request. If additional information is needed, the request builder 704 can access the client data store 610 to retrieve information that has previously been provided by the client device. This allows the request made through the API interface 622 to be fairly simple, providing, for example, only a client identifier when the actual requests made to the external data stores require a more substantial set of client data to service the request.

A source selection process 706 can take the identified subset of the plurality of external data stores 620 that are capable of servicing a request type, and select a single external data store to service this particular request. A stored set of thresholds 708 that can be dynamically updated in real-time can be used by the source selection process 706 to balance the manner in which requests are funneled between the plurality of external data stores 620.

As described above, once a single external data store is selected, it may require very specific formatting according to its exposed web interface. For each of the plurality of external data stores 620, the external data interface may include a specific request packaging function 710 and external interface 712. The request packaging function 710 can perform the high-level repackaging of the request received from the request builder 704 to match the format and data fields required by the selected external data store. The external interface 712 can then handle the interaction between the external data interface 604 and the selected external data store. One advantage provided by this system is that when the public interfaces of the external data stores change, the only changes that need to be made to the cloud system 106 can be isolated to the request packaging functions 710 and the external interfaces 712. Therefore, these changes and external-system-specific details can be abstracted from the rest of the cloud system 106.

The external interfaces 712 can handle all of the interactions with the external data stores 620, including initiating a session, handling the communication protocol, enforcing security requirements, and monitoring the individual timeout intervals. Each of these functions may be very specific to the particular external interface 712. After receiving a resulting data set from the external data stores, the request packaging functions 710 can translate any results received into a common format for the cloud system 106. Again, this ensures a stable data interface for any requesting system while abstracting the specific formatting details of the external data stores 620. The request packaging functions 710 can generate a standardized response with a payload that may be specific to each subset of external data stores (or request type). Thus, any requesting system 602 making a particular function call through the API interface 622 can receive a standardized response regardless of which of the plurality of external data stores 620 actually services the request.

Before being forwarded to the requesting system, the formatted response can be evaluated by an evaluation engine 714. For example, the data received from the external data store may be used to verify fields provided from the client device. The evaluation engine 714 can compare fields received from the client device to corresponding fields in the formatted response to determine whether the fields received from the client device can be verified. Some embodiments may use stored thresholds or other metrics in that comparison. For example, if a value provided by the client device is within 5%, 10%, 50%, 20%, etc., of the corresponding value provided from the external data store, then the value in the field provided by the client device can be verified. In another example, a value provided from the external data stores 620 can be analyzed without requiring comparisons to data received from the client device. Some external data stores may provide a score or metric for a user of the client device. This score can then be compared to predetermined score thresholds to determine whether certain actions need to be taken by the user of the client device, or whether the user of the client device is eligible for certain workflow options. The evaluation engine 714 can use the evaluation results to interface with the workflow manager 606. For example, if values provided from the client device can be verified using corresponding values received from the external data stores, then certain tasks can be eliminated from a client workflow in the workflow manager 606. Conversely, if these values cannot be verified, then the evaluation engine 714 can add tasks to the workflow, such as requiring additional and/or manual verification of these values.

Some embodiments may include a file intake service 608. The file intake service may include a first component 608-1 that is resident in the external data interface 604 and/or the cloud system 106, as well as a second component 608-2 that is resident on the data center 138. Some external data stores may provide documentation that can be used later to document and/or prove the data received from the external data stores 620. These documents are generally not needed in the external data interface 604 to service future requests, but may be required to complete the process described above in FIGS. 1-4, an may require secure storage. Therefore, the first component 608-1 can transfer documents and/or data to the second component 608-2 in the data center 138 to be encrypted and securely stored. In some embodiments, the first component 608-1 can generate a message that is sent to the second component 608-2 indicating that new data and/or documents are available. The second component 608-2 can then pull documents and/or documents from the first component 608-1, perform any necessary document format conversion, encrypt the results, and store them securely in the on-premises data store 614. Note that the second component 608-2 can pull documents from the first component 608-1 using batch requests or at a later time after the request is serviced. The second component 608-2 can also subscribe to messages or events produced by the first component 608-1.

The data retrieved from the external data stores 620 can then be returned in a response having a standardized format for the request type through the API interface 622. In some embodiments, results of the evaluation engine 714 can also be included in the response. For example, some responses can include a flag or indication denoting whether the data provided by the client device was verified by the data provided from the external data stores 620.

Generating Queries Through Model-Based Cognitive Computing

In the example architecture described above, the cloud system and the on-premises data center execute numerous processes for granting access to a resource. These processes and other similar processes may include an interactive communication session between a client device and the server. For example, the server may present a dynamic series of progressive web forms to the client device, and the user may progressively provide more and more information as they navigate through the progression of web forms. In order to elicit the required information from the user through the client device, the server can generate a sequence of questions, or queries, that can be presented to the user. By answering these queries, the user may provide all the information required for the process of granting access to the protected resource, such as access, qualification, and/or approval.

The success of the entire process may hinge on how accurately and efficiently the right information can be retrieved from the user. Because each user will have different, living situations, marital relationships, and other unique distinguishing characteristics, applying a one-size-fits-all set of queries to the user may not necessarily be the most efficient method of retrieving information. Some users may provide information early on in the interactive session that can be used to streamline or augment the questions that are presented later in the session. The goal of the embodiments described herein is to present the most efficient, clear, and necessary sequence of queries to the user such that they result in the most complete and accurate set of responsive information. Prior to this disclosure, similar systems would present questions that were not based on the entirety of the context surrounding the interactive communication session. These less-efficient query sequences often resulted in incomplete or conflicting information received from user. In some cases, users became frustrated with questions that they felt were not necessarily required for their particular situation. Users who felt that their time was being wasted or spent inefficiently were less likely to finish the process, resulting in client data sets that were incomplete or otherwise insufficient to, for example, grant access to a protected resource. Users who were asked unnecessary questions that did not apply to their situation or for which the answers could be retrieved from third-party data sources were observed to be more likely to exit the application process early. In contrast, users who are asked streamlined and efficient queries provided by these embodiments are far more likely to complete the process.

In some cases, the embodiments described herein may provide queries to the client device. These queries may be answered directly by the user and received by the client device from the user. Alternatively or additionally, some embodiments may provide queries to a terminal device to be presented to an "influencer." The influencer can then present the queries to the user and enter responses received from the user into the terminal device. The influencer adds a third dimension to the process. Therefore, the efficiency of the queries may also be based on the role of the influencer. Questions can be streamlined by using an interface to one or more curated data sources. Information can be retrieved from these data sources such as property information, income information, asset information, credit information, and other personal/property information. Constraints, such as qualification rules, industry regulations, and laws or statutes can further be used to identify information that is required from the user. Furthermore, a current state of the client data set, as well as the context of the transaction and/or communication session can influence the query sequence. In some embodiments, results from previous communication sessions can be used to dynamically shape query sequences using an iterative machine-learning process.

Figure 7A:
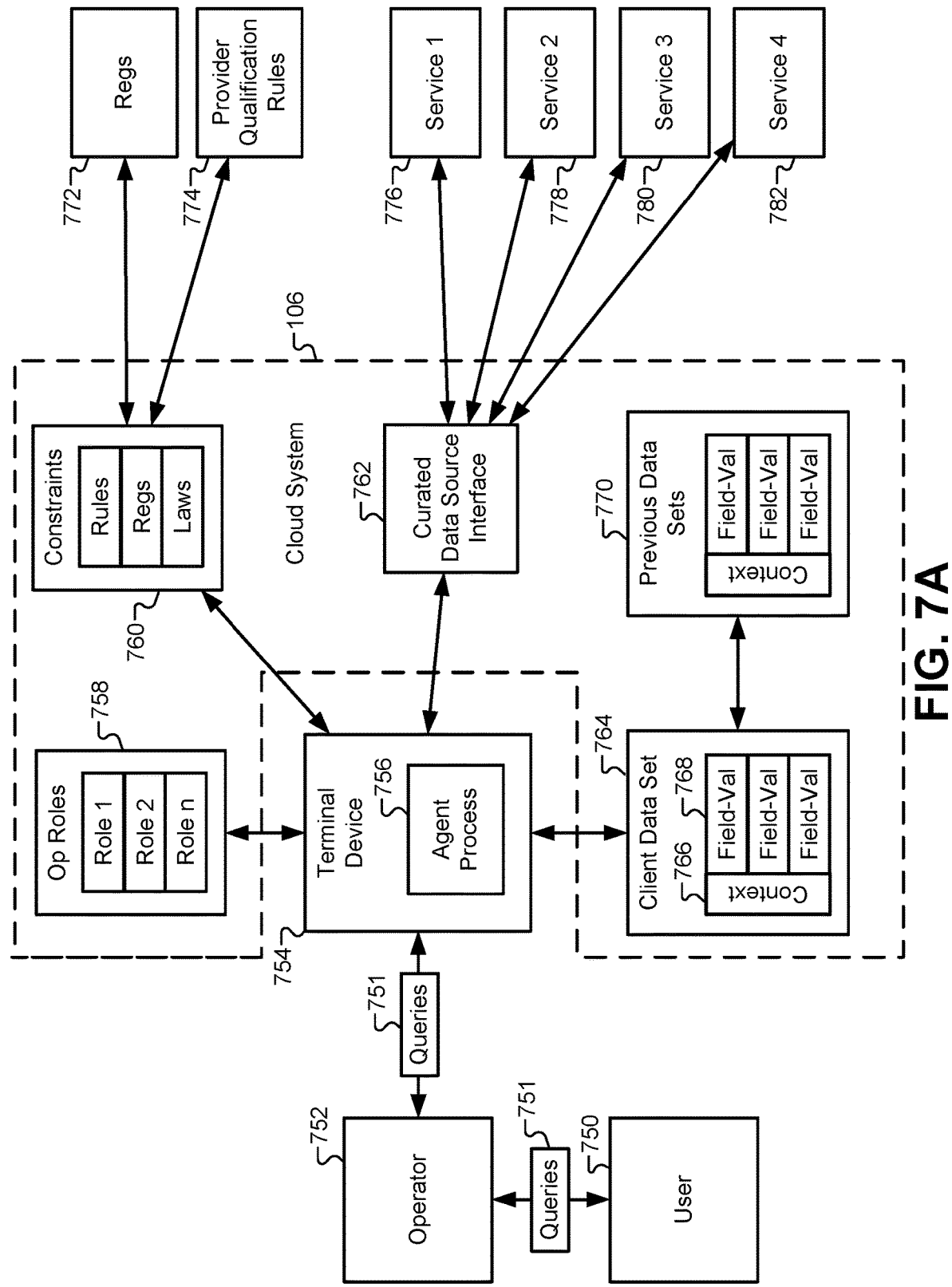
FIG. 7A illustrates a simplified block diagram of a system for generating query sequences, according to some embodiments.

FIG. 7A illustrates a simplified block diagram of a system for generating query sequences, according to some embodiments. In this embodiment, a terminal device 754 is operated by an operator 752. The operator 752 may be the "influencer" described above. For example, the influencer/operator can be a human operator that helps the user 750 through the process. The influencer may be any professional service provider that helps the user 750 through the process. The operator 752 can interact with the terminal device 754, which may include a desktop computer, a laptop computer, a tablet computer, a smart phone, a PDA, a voice-activated digital assistant, a smart-home device, a virtual-reality headset, an augmented-reality headset, and/or any other computing device capable of presenting queries to the operator 752 and receiving responses from the operator 752.

The terminal device 754 may include an agent process 756 operating at least in part on the terminal device 754. In some embodiments, the agent process 756 can operate entirely on the terminal device 754. The agent process 756 may reach out directly to external data stores, such as a property service 776, an income service 778, an asset service 780, a credit service 782, and so forth. In these embodiments, the agent process 756 may or may not need to communicate with a cloud system 106 as an intermediary between the agent process 756 and the external data stores. Thus, the agent process 756 may operate as an application, or "app," on the terminal device 754 independently.

In some embodiments, the agent process 756 may be deployed to a plurality of terminal devices and/or client devices to support a continuous, multi-device experience. For example, the user 750 may begin the interactive communication session using a smart phone, and the agent process 756 can be deployed as an app operating on the smart phone of the user 750. The user 750 may pause the communication session and later ask the operator 752 for help. The operator 752 can then load the agent process 756 on the terminal device 754 to access the client data set 764 along with the context 766 of the communication session that was previously being constructed by the agent process 756. The agent process 756 can then resume the communication session using the context 766 on the terminal device 754 to provide a seamless transition for the user 750 between devices.

In the embodiment of FIG. 7A, the agent process 756 may communicate with other processes operating on the cloud system 106. The agent process 756 may run in part on the terminal device 754 and in part on the cloud system 106. In some embodiments, the agent process 756 may operate entirely on the cloud system 106 and provide a user interface for the terminal device 754, such as a frontend website with web forms that may be completed by the operator 752. Therefore, the example of the agent process 756 operating on the terminal device 754 illustrated in FIG. 7A is provided only as an example and is not meant to be limiting.

The agent process 756 can generate a sequence of queries 751 that are presented to the operator 752 through a display device of the terminal device 754, such as a screen, touch screen, monitor, or audio output. The operator 752 can then present the queries 751 to the user 750 and receive corresponding responses. The operator 752 can then provide the responses to the agent process 756 through an input device of the terminal device 754, such as a keyboard, an audio microphone, a touchscreen, or other input device.

The agent process 756 may act as the "brain" of the interactive communication session. One of the objectives of the agent process 756 is to determine what questions should be asked to complete a client data set 764 for the user 750. The agent process 756 can build a context around the conversation using information provided from the user 750 and the plurality of curated data sources to intelligently select and/or design query sequences at run time during the interactive communication session. In short, it is the agent process 756 that optimizes the collection of data by asking the fewest, most efficient, and unambiguous questions possible while maintaining a predetermined level of user and operator comfort. Put another way, the agent process 756 generates query sequences that are specifically tailored for both the operator 752 and the user 750 to quickly and efficiently populate the client data set 764 as completely and accurately as possible.

Specific examples and techniques illustrating how the agent process 756 generates the query sequences and the context 766 will be provided throughout this disclosure. FIG. 7A provides a high-level overview of the different inputs that are considered by the agent process 756. In some embodiments, the agent process 756 can access one of a plurality of operator roles 758. Different influencers may act as the operator 752 and may have different roles. Each of these different roles may involve different types of relationships with the user 750. The nature of these relationships may be used to select different queries that are appropriate for the operator 752 acting within their role to ask the user 750 while maintaining a level of comfort and trust between the operator 752 and the user 750. When the operator 752 activates the agent process 756, the agent process 756 can select one of the plurality of operator roles 758, and that role can be stored as part of the context 766 and used to select or tailor queries 751.

In some embodiments, a curated data source interface 762 can be used to access information for the user 750 such that questions can be eliminated or streamlined from the sequence of queries 751. For example, the curated data source interface 762 may access a plurality of external data stores, such as a service 776, a service 778, an service 780, a service 782, and so forth. As will be described below, the curated data source interface 762 may utilize the external data interface 604 described above in FIG. 6. When identifying information for the user 760 is retrieved through the agent process 756, that identifying information can be used to request and receive information from these external data stores and to store those values in the client data set 764. By retrieving this information from the external data sources, the curated data source interface 762 can populate many of the fields 768 in the client data set 764 without querying the user 750. In response, the agent process 756 can determine which fields 768 have been adequately populated by the curated data source interface 762 and streamline the sequence of queries 751 to eliminate queries that are focused solely on retrieving information that was already retrieved from the curated data source interface 762.

The agent process 756 may also utilize the state of the client data set 764 to generate the sequence of queries. Specifically, the agent process 756 can examine values stored in the fields 768 in the client data set 764 to identify missing values, incomplete values, conflicting values, and/or values that need to be verified based on their source. By identifying fields 768 that require further clarification and/or inputs from the user 750, the agent process 756 can select sequences of queries that are specifically targeted to retrieving such information. In addition to populating the fields 768, the client data set 764 can also store a context 766 associated with the interactions between the agent process 756 and the user 750. The context 766 may include data points that are ascertained during the interactive communication session that are not necessarily stored as values in the fields 768 of the client data set 764. For example, the context 766 may include information that characterizes interactions with the user 750, such as the time it takes to enter responses, the accuracy of user responses, goals or objectives that are provided by the user 750, impressions or characterizations of the experience made by the operator 752, rescheduling requests, and/or other soft-factors that can be used to further characterize the interactions. In some embodiments, the context 766 that is built by the agent process 756 approximates the way that a human would characterize the interaction with the user 750. Based on these inputs, the agent process 756 can characterize how the interactive communication session is proceeding, estimate whether it is likely to be successful, and determine further queries that can be presented. The context can identify questions that make the user 750 uncomfortable, questions that make the operator 752 uncomfortable, and/or provide recommendations to the operator 752. Some embodiments may provide incentives to the operator 752 to prompt the operator 752 to ask difficult questions or questions for which the user 750 previously provided an incomplete or inadequate response. These data points can be stored in the context data structure in the client data set 764 and used as an input to the cognitive function of the agent process 756 to help steer the interactive communication session.

Some embodiments may also use previous data sets 770 from this user 750 and/or other users. For example, if a user previously engaged in an communication session using the cloud system 106, the cloud system 106 may already store information related to the user 750. This historical information and/or the accompanying context in the previous data set 770 can be used to shape the current interactive communication session. For example, queries that were previously determined to be inefficient or less effective can be identified in the previous data set 770 and used to redirect query sequences in the current communication session. Similarly, queries that were efficient and effective in the previous data set 770 can again be presented in the current communication session to achieve similar results and provide a familiar feel to the user 750. Information that was previously obtained in the previous data set 770 can be used to populate the current client data set 764 such that the same queries do not need to be presented twice to the user 750. In some embodiments, results from the previous data set 770 can be used to predict outcomes of the current communication session. For example, if the previous data set 770 indicates that the user is unlikely to successfully qualify for a particular resource or to complete the interactive communication session, this can be used to streamline or terminate the current communication session such that resources can be conserved on the terminal device 754 and the time of the operator 752 can be used more efficiently.

In some embodiments, the previous data set 770 may also include information from other users besides the current user 750. As will be described in greater detail below, users and/or communication sessions similar to the current user 750 and/or current communication session can be identified. Query sequences that were affected with other previous users may be predicted to also be effective with the current user 750 by the agent process 756. Response patterns identified in the previous data set 770 from other users may be used to predict outcomes for the current user 750. Responses provided by the current user 750 can be used to identify goals or objectives of the user 750 based on an approximate matching the response patterns to those of previous data sets 770 and then identifying the goals and objectives in the previous data set 770. Some embodiments may also approximately match information from previous users with the current user 750. For example, if a prior user requested a process that matches a current address of the current user 750, the information for that address from the previous data set 770 can be retrieved, anonymized to protect user identities, privacy, and confidential information, and stored in the client data set 764 without querying the curated data source interface 762 or asking the user 750. A context indicating a reluctant user from the previous data sets 770 can be used identify queries that may lead to a more successful outcome with the current user 750. In short, previous data sets 770 can be clustered and classified based on any characteristic, and the query sequences that were successful/unsuccessful in those previous data set clusters can be used to influence the selection of query patterns for the current user 750 by the agent process 756.

In some embodiments, the agent process 756 may determine which fields 768 in the client data set 764 need to be populated based on a plurality of constraints 760. The plurality of constraints 760 may include rules that are used to determine whether the user 750 will qualify for certain resources. These rules can be downloaded from qualification services 774. The constraints 760 may also include regulations that govern how information is received, stored, and processed. For example, regulations that govern the lending industry may be used as constraints to determine types of questions that may be asked and/or the type of information needed from the user 750. These regulations can also be downloaded from an external source 772 and updated dynamically such that they are always kept current. The constraints 760 may also include laws and statutes that additionally govern the type of information that must be received in order to qualify for a resource, thresholds that may be applied to the client data set 764 to determine whether they qualify for certain resources, and so forth.

Figure 7B:
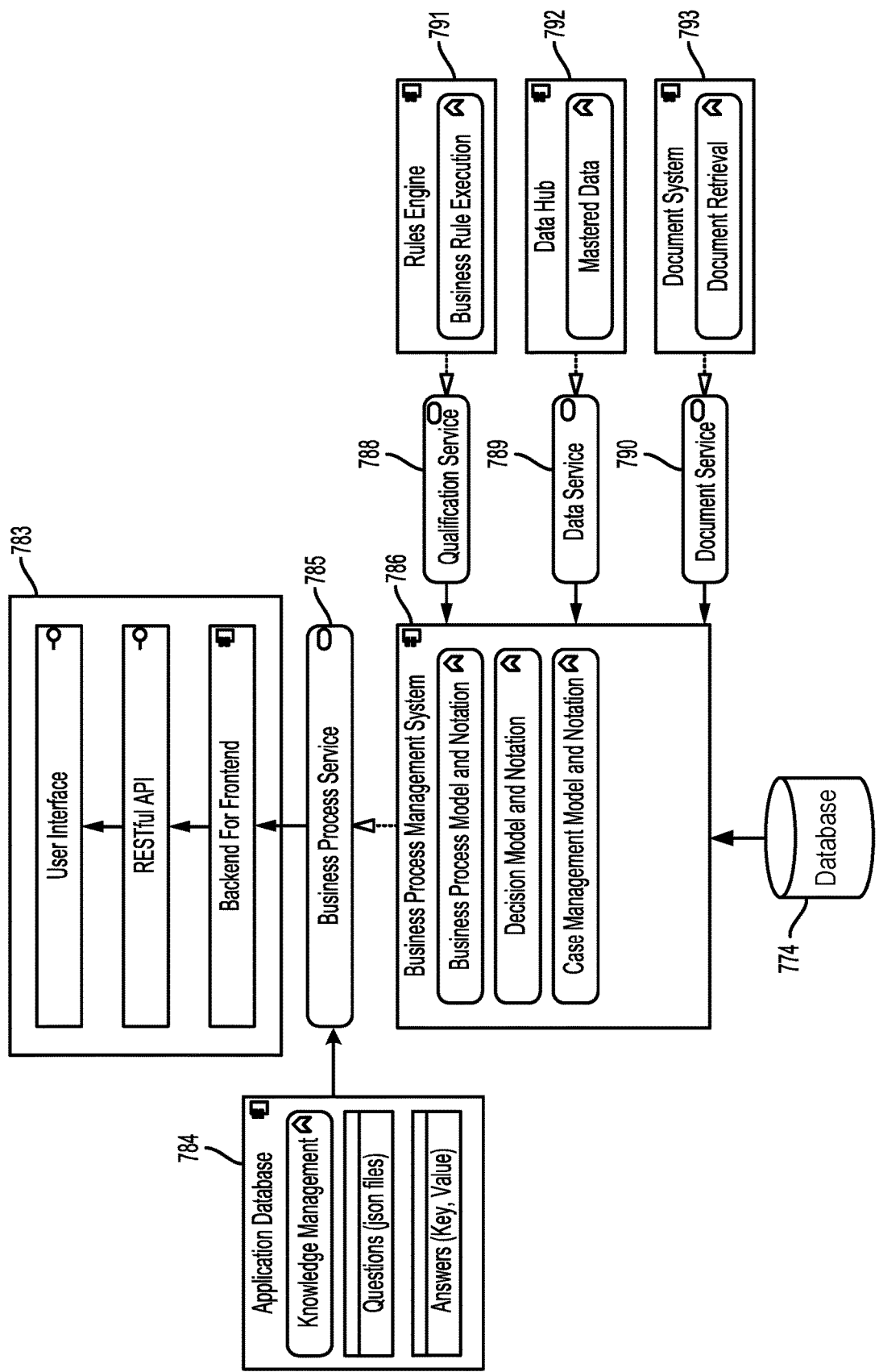
FIG. 7B illustrates a simplified architectural diagram illustrating how information is processed by the cloud system and the agent process, according to some embodiments.

FIG. 7B illustrates a simplified architectural diagram illustrating how information is processed by the cloud system 106 and the agent process 756, according to some embodiments. As will be described in greater detail below, the agent process 756 may include a business process management system 786 that utilizes a plurality of different model notations. The business process management service 786 is a model driven process that models the behavior of the agent 756. This may be contrasted to previous solutions where the behavior of the agent 756 had to be written in a high-level programming language. The plurality of models in the business process management system 786 can describe how the agent "thinks" when evaluating a context and selecting query sequences. The combination of these models can be used to model the behavior of the agent and to develop a model-driven agent 756.

The business process management system 786 can use a qualification service 788 that interfaces with a rules engine 791 to execute business rules. The business process management system 786 may also use a data service 789 that interfaces with the data hub 792, along with a document service 790 that interfaces with a document system 793. As described above, a business process service 785 can interface with a user interface system 783, which may include a backend, an API, and a user interface displayed on the terminal device. The business process service 785 provides the user interface system 783 with identifiers to questions that can be dereferenced from the application database 784 for subsequent display on the user interface.

Figure 7C:
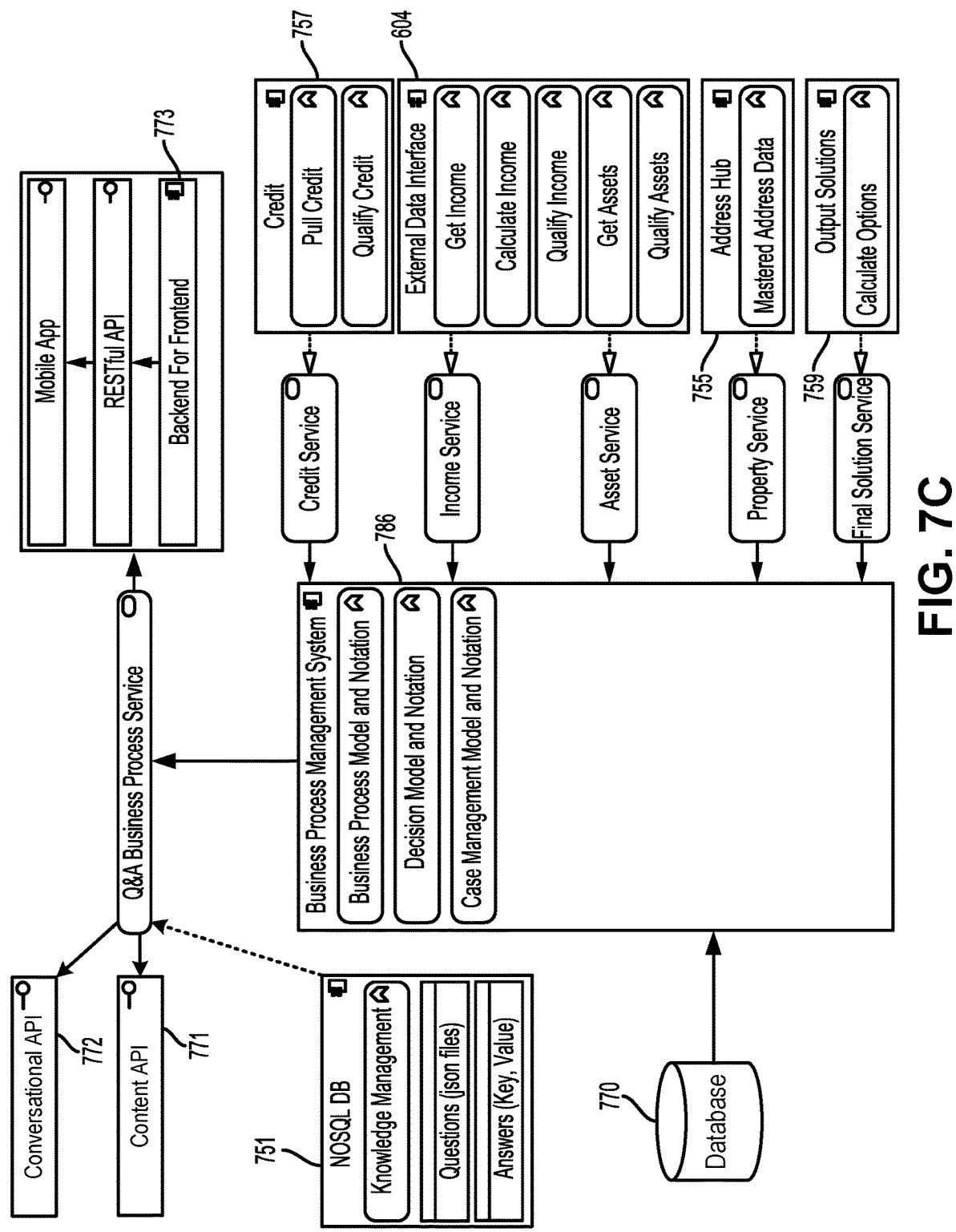
FIG. 7C illustrates a second simplified architectural diagram illustrating how information is processed by the cloud system and the agent process, according to some embodiments.

FIG. 7C illustrates a second simplified architectural diagram illustrating how information is processed by the cloud system 106, according to some embodiments. As described above, various services can be connected through the interfaces of the cloud system 106, such as the external data interface 604, a solution engine 759, an address service 755, and so forth. Each of these services may connect to external data sources that are not specifically depicted in FIG. 7C. These interfaces may receive requests from the business process management system 786 and handle the processing and translation of those requests with the external data services. For example, the external data interface 604 may operate as described above in FIG. 6 to receive data requests from the business process management system 786 (along with other systems in the cloud system 106), to locate external service providers that can provide the data, and to handle executing the requests. This data can be returned to the business process management system 786 to complete and/or validate portions of the client data set.

FIG. 7C also includes a conversational API 772. The conversational API 772 is a component that manages and analyzes current and historical conversations between the cloud system 106 and the client device, or more specifically, between the influencer and the user. When a session initially begins, the conversational API 772 can allocate a new data structure representing the conversation. This may include a conversation ID, identifiers for parties specific to the conversation, and other information that uniquely characterizes or identifies the conversation in relation to other conversations. After the conversation has been initiated, and as questions are presented to the user and answers are received through the user interface, the conversational API 772 can store a record of all of the queries and/or responses that are part of the conversation. Therefore, the conversational API 772 not only manages the flow of the conversation, but it also manages a complete historical record that may be analyzed later and/or compared to other historical conversations.

Once a request to begin a conversation is made through the conversational API 772, the conversational API 772 can signal the business process management system 786 to begin determining how the conversation should proceed. For example, the business process management system 786 can analyze the state of the current data set as described above in FIG. 7A to determine what data has been received, what data is still missing, and what query packages should be presented to the user next to best fill in missing information. The business process management system 786 may also determine if enough information has been received in the client data set to initiate a validation procedure on at least a portion of that data. For example, the business process management system 786 may determine that a threshold amount of property information has been received, and may initiate a validation of the property information through the address hub 755. In another example, the business process management system 786 may determine that certain data points are missing from topic areas in the client data set, and then generate topic codes that identify topics related to these data points. By sending query sets that are related to these topics, the system can aim to elicit responses from the user that will fill in the missing data points in the client data set.

The system may also include a content API 771. The content API 771 may store a series of structured data sets (e.g., JSON format) that represent sequences of queries or questions that may be presented to the user. Each query set may be directed to a single topic and identified by a topic code. For example, one topic code may identify a set of queries that are specifically designed to retrieve personal identifying information from the user. Another topic code may identify a set of queries that are specifically designed to retrieve information regarding a resource or property address. Another topic code may identify a set of queries that are specifically designed to retrieve information regarding an employment or job status of the user. The content API 771 may receive one or more topic codes and provide sets of queries in the structured data objects that can then be presented through the user interface for the influencer.

In addition to providing query sets, the content API 771 may also provide metadata associated with each query. The metadata may include expected response formats and codes for each query. This metadata can be passed to the user interface, such that the user interface can validate answers that are received from the influencer/user. For example, the metadata may include restrictions on the types of answers that may be accepted (e.g., integer values, character strings, maximum lengths, numerical ranges, etc.). The user interface may then have enough information to link a specific answer received through the user interface to a question code and to perform a first level of validation on answers received.

Some embodiments may also include a backend-for-frontend (BFF) 773, which is a lightweight service that ties together various client experiences. This allows the client-facing user interfaces to be customized for specific platforms, without requiring these user interfaces to include business logic. Prior to this disclosure, a technical problem existed where changes to the business logic used to drive the conversation resided in the front-end user interfaces for each specific platform (e.g., Apple®, Android®, web, etc.). Therefore, changing the operation of the business logic required making changes to each of the platform-specific front ends. This process was time-consuming, error-prone, and required modifications to a number of different software modules to provide a consistent user experience across different platforms.

The BFF 773, the conversational API 772, and the content API 771 as depicted in FIG. 7C solve this problem by removing the business logic from the platform-specific front ends. Instead, the user interfaces can be agnostic to the specifics of the conversation. The content API 771 can provide just enough information to allow the presentation of the queries, validation of the responses, and the linkage between the responses and corresponding question codes. The BFF 773 uses information provided by the content API 771 to build a response payload to send back to the conversational API 772. Thus, when any changes need to be made to the query sets or to the way the conversation is run, these changes can be made a single time at the conversational API 772 and/or the content API 771 instead of requiring multiple changes in the associated user interfaces. The user interface can receive responses, pair them with questions in the query sets received through the BFF 773, and pass the structured responses through the BFF 773 back to the conversational API 772 and/or the content API 771. In some embodiments, this response payload may be kept relatively thin. For example, the answer payload may provide sets of question IDs paired with answers in a (key, value) format.

When responses are received through the BFF 773, the responses may be passed to the conversational API 772. The conversational API 772 can receive the answers and store them in the data structure that documents the history of the conversation. The conversational API 772 may intercept any substantive exchange between the user/influencer and the cloud system 106 such that all aspects of the conversation are recorded for later analysis.

In addition to passing the answers to the conversational API 772, the answers may also be passed to the business process management system 786 and a client data set database 770. The business process management system 786 may translate the answers provided in response to the query set into intelligent data points for the client data set. For example, for a topic targeted at eliciting personal identifying information from a user, one of the questions asked may be "are you married?" and the corresponding response may be "yes." The business process management system 786 may receive this answer and translate it into a specific marital status in a format required for the client data set.

The translated data points from the business process management system 786 may then be stored in the client data set database 770. In some embodiments, the client data set database 770 may be implemented using a traditional database structure. Other embodiments may include additional processing capabilities in the client data set database 770 to process received information, generate alerts when information is changed, generate indications when certain portions of the data set are complete and ready for validation, and/or other functionality. The client data set database 770 may also be shared amongst other systems in the cloud system 106. For example, the client data set database 770 may share data from previous application processes, other web interfaces, and other systems not specifically shown in FIG. 7C.

After receiving the answers to the queries, the business process management system 786 may initiate the next step in the process of completing the client data set by analyzing the data set, determining what data points are missing, and determining what topic should next be presented to attempt to complete those missing data points. The business process management system 786 may select one or more topics, and send the topic IDs to the conversational API 772 as described above. This process may continue until the session is terminated or until the client data set is completed and validated according to a predefined criteria for moving forward in a process.

Figure 7D:
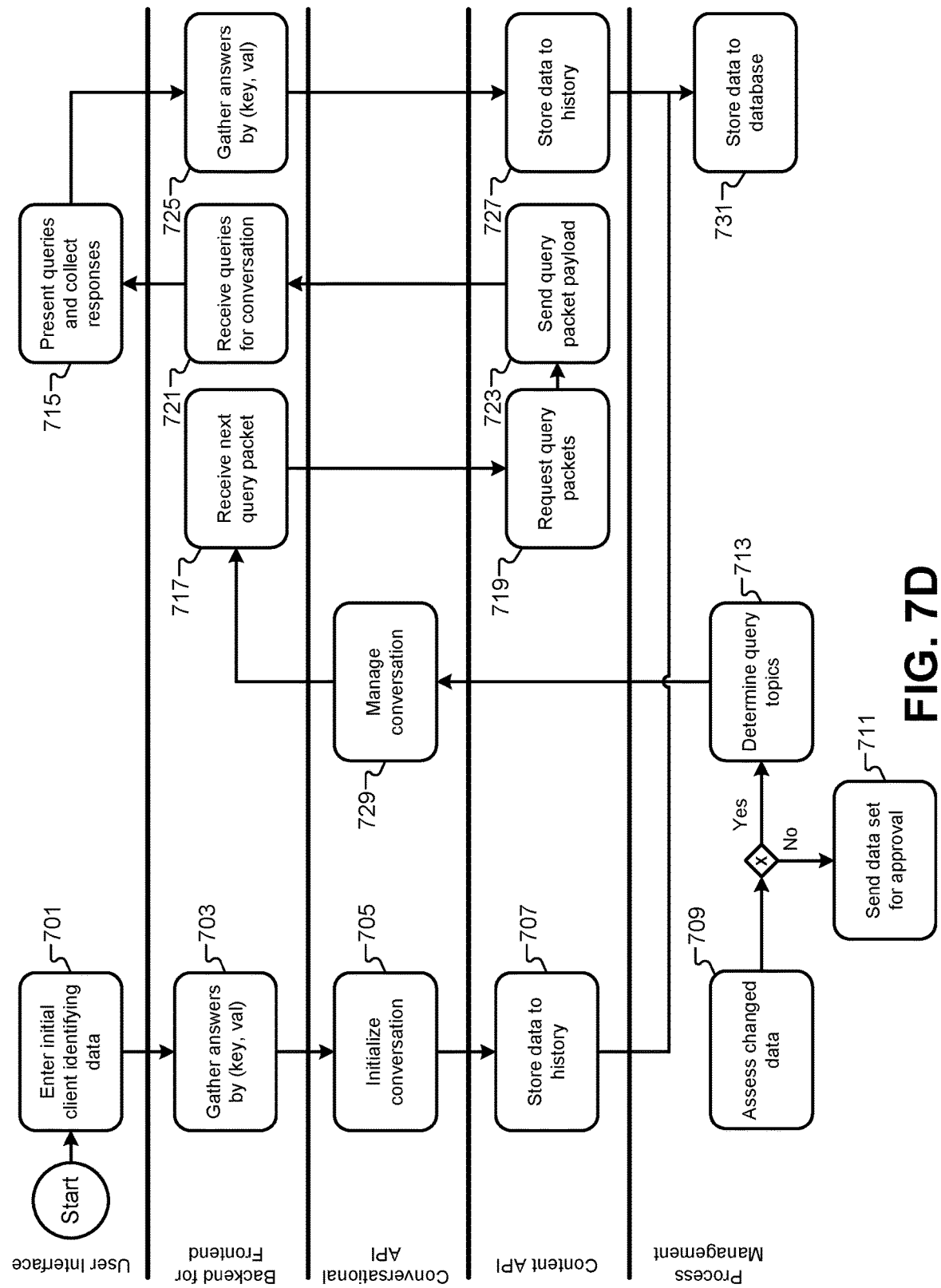
FIG. 7D illustrates a flow diagram of a process for generating queries and processing responses during an interactive communication session, according to some embodiments.

FIG. 7D illustrates a flow diagram of a process for generating queries and processing responses during an interactive communication session, according to some embodiments. The process flow on the left side of the diagram illustrates a basic process for initializing a conversation. At step 701, the user interface can receive some initial information from a user to begin a conversation. For example, an influencer may generate a request through user interface to begin an application process for communication session. The user interface may also receive a name and a type of request to start a process. At step 703, the BFF may interact with the conversational API to begin gathering responses to the initial set of information received through the interface, and this information may be packaged in a (key, value) format. The conversational API 705 can initialize the conversation and begin storing the initial responses in a data structure documenting the conversation. The content API 707 may store data to the conversation history at step 707. The initial information received from the user interface may then be passed to the business process management system to be stored in the client data set database at step 731.

The process flow at the bottom of the diagram in FIG. 7D illustrates an asynchronous process that is executed by the business process management system. As changes are made to the client data set in the client data set database, the business process management system can receive indications specifying how the data has changed. At step 709, the business process management system can assess the data changes and select new query topics at step 713 to fill in any missing data points. Alternatively or additionally, the business process management system may also identify portions of the data set that can be validated or approved at step 711.

The process flow on the right side of the diagram in FIG. 7D illustrates a process for presenting queries and processing responses that may be iteratively executed during a conversation. At step 729, the conversational API may manage the conversation throughout, by recording any and/or all aspects of the conversation and triggering different query/response sessions. When a new topic is received, the BFF may receive a set of topic IDs from the business process management system at step 717 and pass a request for query sets to the content API at step 719. The content API may then access predefined query sets at step 723, and send those query packets to the BFF at step 721. The BFF may then present queries and collect responses through the user interface at step 715. The user interface may pass responses that are organized in a (key, value) format back through the BFF at step 725 and on to the content API where the responses can be stored in the conversation history step at 727, and to the business process management system where the responses can be stored in the client data set database at step 731.

After new answers are received through this process, the asynchronous process at the bottom of FIG. 7D may again be executed. For example, the business process management system may assess any changes to the data set resulting from the latest responses, request validation of any completed data sets, and/or determine new query topics to fill in missing data points in the data set. Next, the new query topics can be sent to the BFF at step 717, and the process on the right side of FIG. 7D may again be executed. This iterative process may be repeated until the data set is complete and/or validated.

Figure 8:
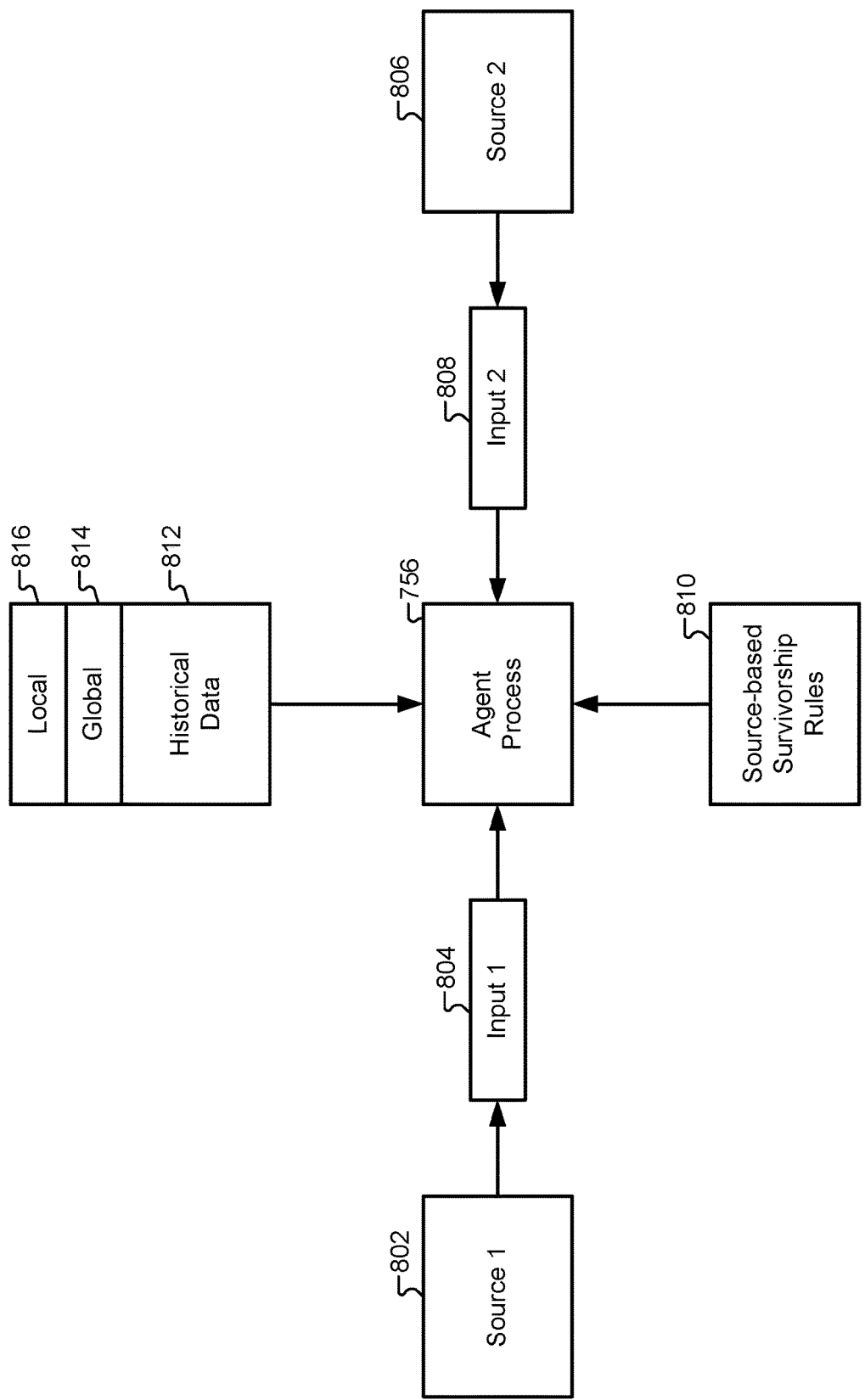
FIG. 8 illustrates how the agent process can integrate inputs from various sources, according to some embodiments.

FIG. 8 illustrates how the agent process 756 can integrate inputs from various sources, according to some embodiments. In this example, a number of different inputs 804, 808 may be received for a single field in the client data set. Input 804 may be received from a first source 802, and input 808 may be received from a second source 806. Instead of simply overwriting previous inputs when new inputs are received, the agent process 756 can apply one or more source-based survivorship rules 810. These rules may use historical data 812 to integrate the inputs 804, 808 into the client data set.

The historical data 812 can record the source from which each of the inputs 804, 808 was received. The historical data 812 can also provide a history of other inputs received from those sources 802, 806. The history of each source can be used to influence which source-based survivorship rules 810 should be executed. For example, the historical data 812 may indicate that inputs received from source 802 are more likely to be accurate than inputs received from source 806. Source 802 may correspond to an income verification service, such as Finicity®, while source 806 may correspond to an input received from the user. The historical data 812 may indicate that the data received from source 802 is nearly always reliable and accurate, while data received from source 806 may be accurate but may usually require verification. The source-based survivorship rules 810 can determine which of the inputs 804, 808 should be given preference when there is a conflict. This determination may be based on how likely it is that the inputs are correct, how likely the inputs are to require external verification, and how important the inputs are to the overall process.

The historical data 812 can include local histories 816 of inputs received from sources related to the current communication session, as well as global histories 814 of inputs received from sources over a collection of communication sessions. For example, an asset verification service may generally be very reliable and used in preference to asset information received from the user. However, a specific user may historically provide more accurate asset information than the asset verification service for that specific user, particularly when the asset verification system is unable to accurately or adequately access assets for the user. In this case, the local history of that source may be used to determine that the asset information provided by the user should survive the conflict of inputs.

Figure 9:
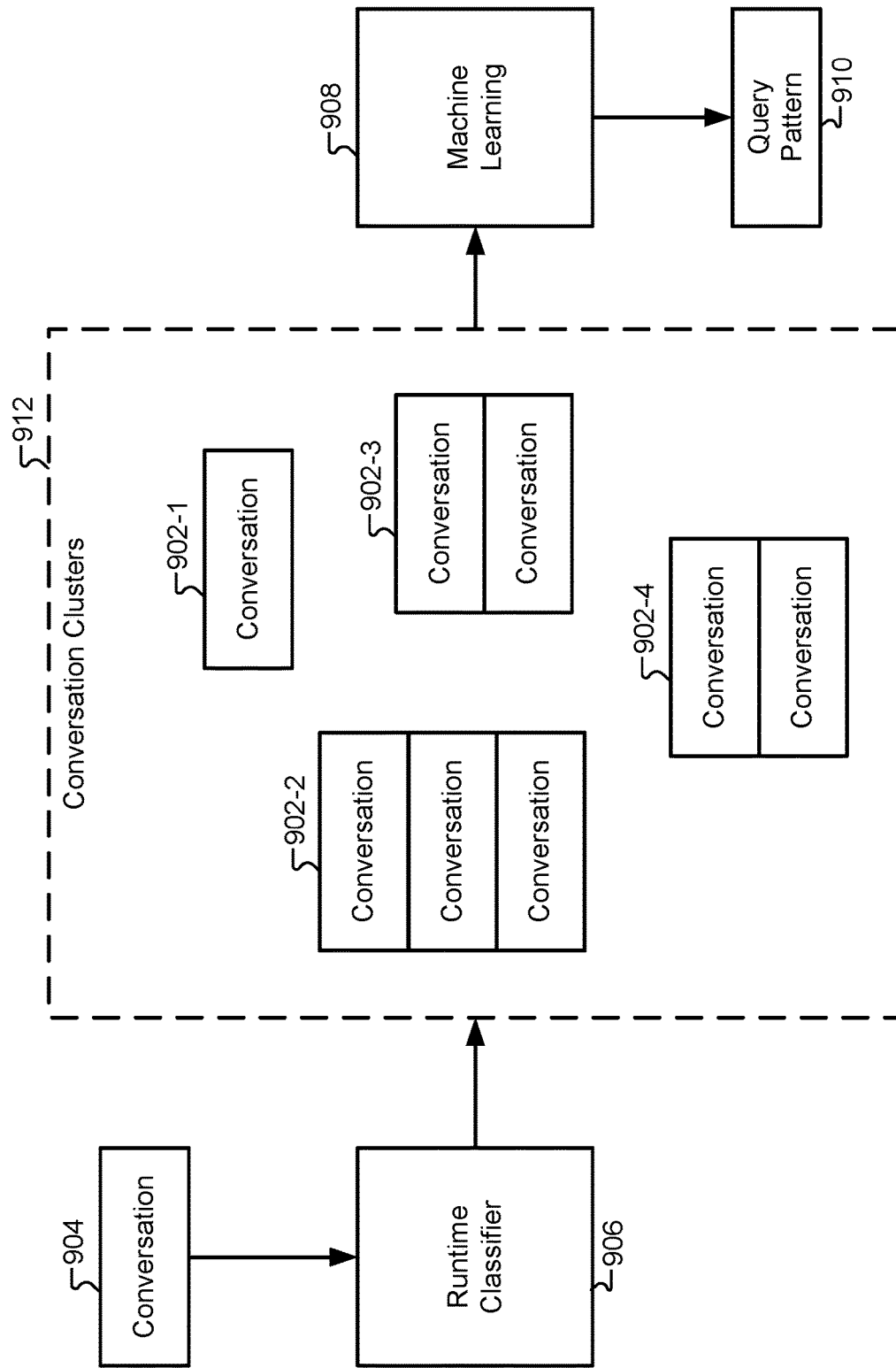
FIG. 9 illustrates a simplified block diagram of how conversation histories can be clustered and analyzed over time, according to some embodiments.

FIG. 9 illustrates a simplified block diagram of how conversation histories can be clustered and analyzed over time, according to some embodiments. As part of the context described above, some embodiments may store conversational histories that include all of the transactions and interactions between the user and the agent process. These conversation histories can then be analyzed and used to influence future conversations based on the results. A conversation 904 can include queries that were presented to the user, user responses, response times, response accuracy, verification results, and/or any other information that can be used to characterize a conversation. The conversation 904 may be stored in the context and saved for later use.

At runtime, the conversation 904 can be processed by a runtime classifier 906. This can be done continuously and/or repeatedly during the current interactive communication session such that the current conversation 904 can be matched to existing conversation clusters as the conversation progresses. The runtime classifier 906 can group previous conversations into clusters 902. The clusters 902 can be formed based on any characteristic saved in the conversation, and a single conversation may be included in a plurality of different clusters. For example one group of conversations 902-1 may be clustered on the basis of having inaccuracies in certain data points received from the user. Another group of conversations 902-2 may be clustered based on user response times. Another group of conversations 902-3 may be clustered based on successfully completing a process. Another group of conversations 902-4 may be clustered based on questions that were presented to the user. The runtime classifier 906 can match the current conversation 904 with one or more of the previous conversation clusters 902 after each question/response from the user.

The plurality of conversation clusters 912 in the current conversation 904 can be processed by a machine learning engine 908 that can generate outputs, such as query patterns 910 based on how the conversation 904 is clustered. For example, inaccurate responses for questions about income and assets that could not be verified may indicate that a user is unlikely to qualify for a particular product. Thus, an indication may be provided by the agent process 756 that the session is unlikely to be successful. In another example, long response times when providing answers may indicate that the user would benefit from shorter, simpler questions, and a query pattern 910 can be generated that is responsive to this situation. In another example, responses that fall within a predetermined threshold range may indicate that a user may be trying to deceive the operator, and the process should be discontinued. It should be noted that these outcomes can be determined automatically by the machine learning engine 908 and do not need to be preprogrammed by an operator. Instead, the system can use the models described below to identify repeated patterns of inputs and interactions that indicate certain results. Different query patterns 910 can be generated to address those results by the agent process.

In addition to the runtime classification process described above, the machine learning engine 908 can analyze the history of conversations and the conversation clusters 912 to identify patterns and generate new query patterns 910 to be used in future interactive sessions. Specifically, the machine learning engine 908 can identify input patterns in each of the conversation clusters 912. Next, the machine learning engine 908 can identify actions that were taken by the agent process 756 along with the associated results of those actions. If the results were successful, a score for those actions can be increased such that they are more likely to be repeated in the future. If the results were less than successful, the score for those actions can be decreased such that they are less likely to be used in the future. The machine learning engine 908 can also identify similar negative results in various clusters and identify common inputs that may have generated the negative results. The machine learning engine 908 can then alter the actions taken that resulted in the negative results. For example, a particular input in a cluster may be observed to be inaccurate in conversations within that cluster. The machine learning engine 908 can identify particular actions or questions that were used to generate the incorrect responses. New queries may be added to the query pattern 910 that were observed to be more successful in other clusters at receiving correct responses.

Figure 10B:
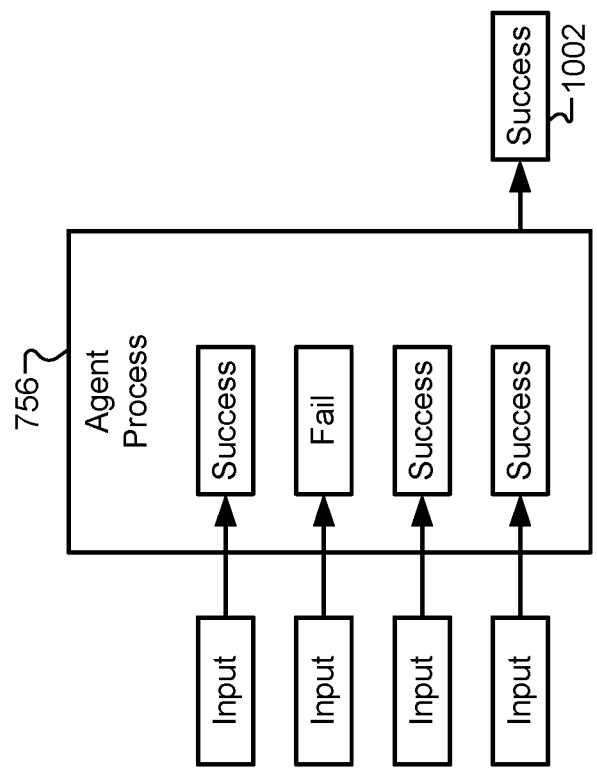
FIG. 10B illustrates how the agent process can predict success based on a different success/fail pattern.
Figure 10A:
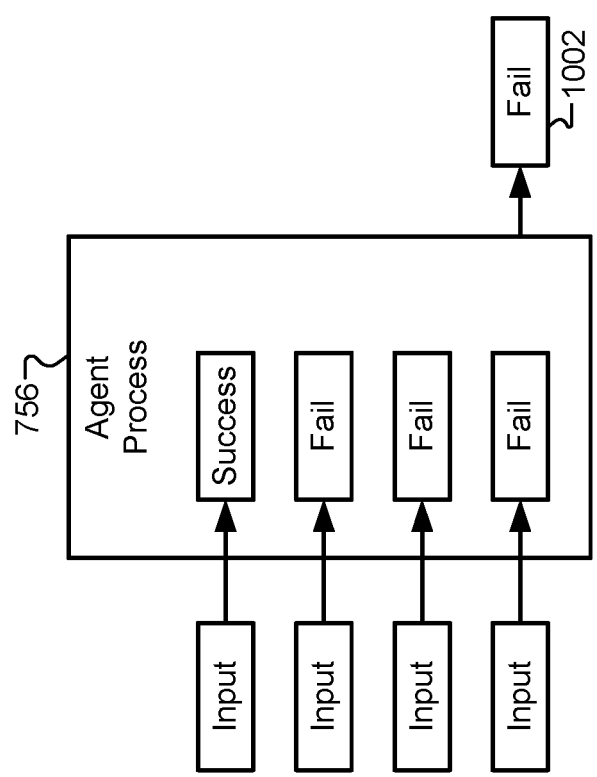
FIG. 10A illustrates how the agent process can use the results of the machine learning engine to predict success or failure of a process executed during a particular interactive communication session, according to some embodiments.

FIG. 10A illustrates how the agent process can use the results of the machine learning engine 908 to predict success or failure of a process executed during a particular interactive communication session, according to some embodiments. The agent process 756 can receive inputs in response to a sequence of queries. Each of the inputs can be characterized on a quality spectrum from being a success, a fail, or somewhere in between. As described above, success or failure may be characterized by whether inputs provided by a user could be properly validated or verified using an external verification service. For example, if any income number provided by a user was within a threshold percentage of any income number provided from an income service, the input provided by the user may be characterized as a success. On the other hand, if asset information provided by a user does not fall within a predetermined threshold percentage of asset information provided from the asset service, then the asset input may be characterized as a fail. Some embodiments may include additional values that range between success and failure.

The run-time classifier described above in FIG. 9 can be used to match the success/fail characterizations of the inputs to previous conversations. The result of this matching can be used to predict a success or failure of the current conversation. For instance, if a previous conversation cluster indicates that the input success/fail pattern illustrated in FIG. 10A indicates that the overall process is likely to fail, then a fail prediction 1002 can be provided to the operator. On the other hand, FIG. 10B illustrates how the agent process can predict success based on a different success/fail pattern.

In some embodiments, if the process is predicted to fail, the machine learning engine outputs can suggest alternative query patterns that may be tried to change the trajectory of the process outcome. As the conversation is continuously analyzed and characterized in real time during the interactive session, questions can be tailored one after another to increase the probability of success of the overall process.

Figure 11:
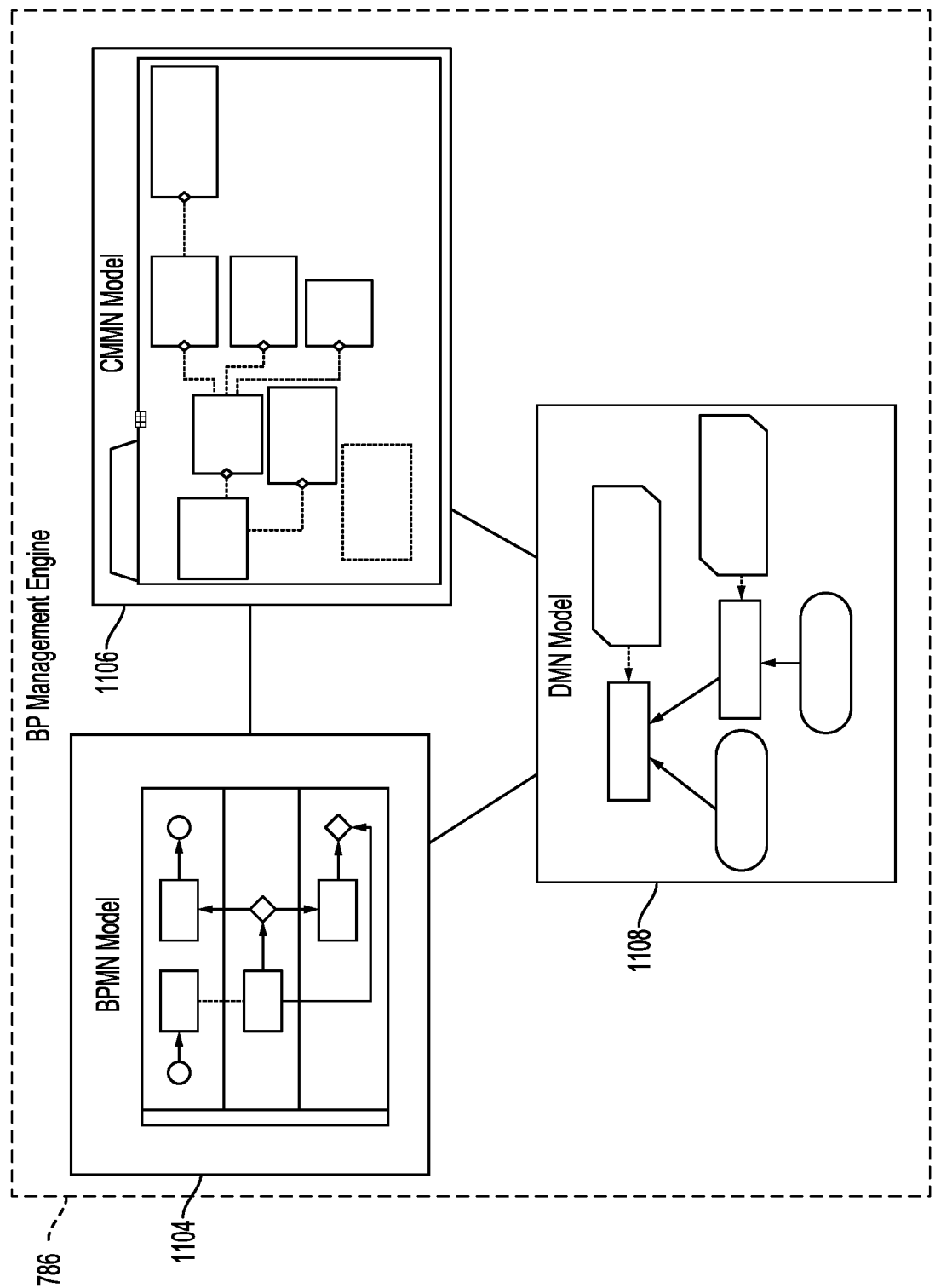
FIG. 11 illustrates the interaction of a plurality of models within the business process management system, according to some embodiments.

FIG. 11 illustrates the interaction of a plurality of models within the business process management system 786, according to some embodiments. Note that many different models may be used in different embodiments. The embodiment of FIG. 11 includes a Business Process Modeling Notation (BPMN) model 1104. The BPMN model may include a flowchart method that models the steps of a business process. The model may represent a sequence of business activities and information flows needed to complete a particular process. By including steps of the process flow, the execution of the process may be guided by the structure of the BPMN model 1104. The model 1104 may include objects, connecting objects, swim lanes, artifacts, events, activities, gateways, sequence/message flows, and/or data associations. The model 1104 may be represented in a textual XML format.

Some embodiments may use a Case Management Model and Notation (CMMN) model 1106 in conjunction with the BPMN model 1104. The CMMN model 1106 may include a graphical notation used to capture work methods that are based on handling of cases requiring various activities to be performed in an unpredictable order and in response to evolving situations. The model 1106 may use an event-centered approach that uses a "case file" concept. The CMMN model 1106 can augment and expand the conceptual space of the BPMN model 1104 by using a less-structure process flow. The CMMN model 1106 can be used to model systems and processes that would be otherwise difficult to model in the structured environment of the BPMN model notation. Additionally, the CMMN model 1106 is particularly well-suited for knowledge-based interactions and project-based activities. The CMMN model 1106 can be used for processes that are driven by information rather than by structure. For example, the model 1106 can be used to analyze a client data set and identify processes that should be executed based on the state of the information and missing data fields.

Some embodiments may additionally use a Decision Model and Notation (DMN) model 1108. The DMN model 1108 can be used to describe and/or model repeatable decisions that can be based on business rules. The DMN model 1108 can be used as a complement to the BPMN model 1104 and the CMMN model 1106. For example, the BPMN model 1104 can model a specific type of activity with specific locations in the BPMN process that utilize decisions defined by the DMN model 1108. In some embodiments, the DMN model 1108 can model specific decision flows using a table. The table may be used to identify corresponding queries that can be presented to the user in specific situations, for example, to obtain missing data elements.

The combination of these three models 1104, 1106, 1108 can be used to model the behavior of the agent process and develop a model-driven agent that can learn over time when accompanied by the embodiments described in FIG. 9. These models can both drive the conversation with the user at runtime and be used off-line to control interactions with the income, property, asset, and/or credit sources described above. These models 1104, 1106, 1108 support modeling the operation of the agent process as a combination of a process layer, a decision layer, and/or a knowledge layer. This model-driven behavior can be contrasted with the traditional method of designing and deploying a software agent. Traditionally, a development environment, such as the Java Agent Development Environment® (JADE) would be used to define the behavior of the agent process in a high-level programming language.

Figure 12:
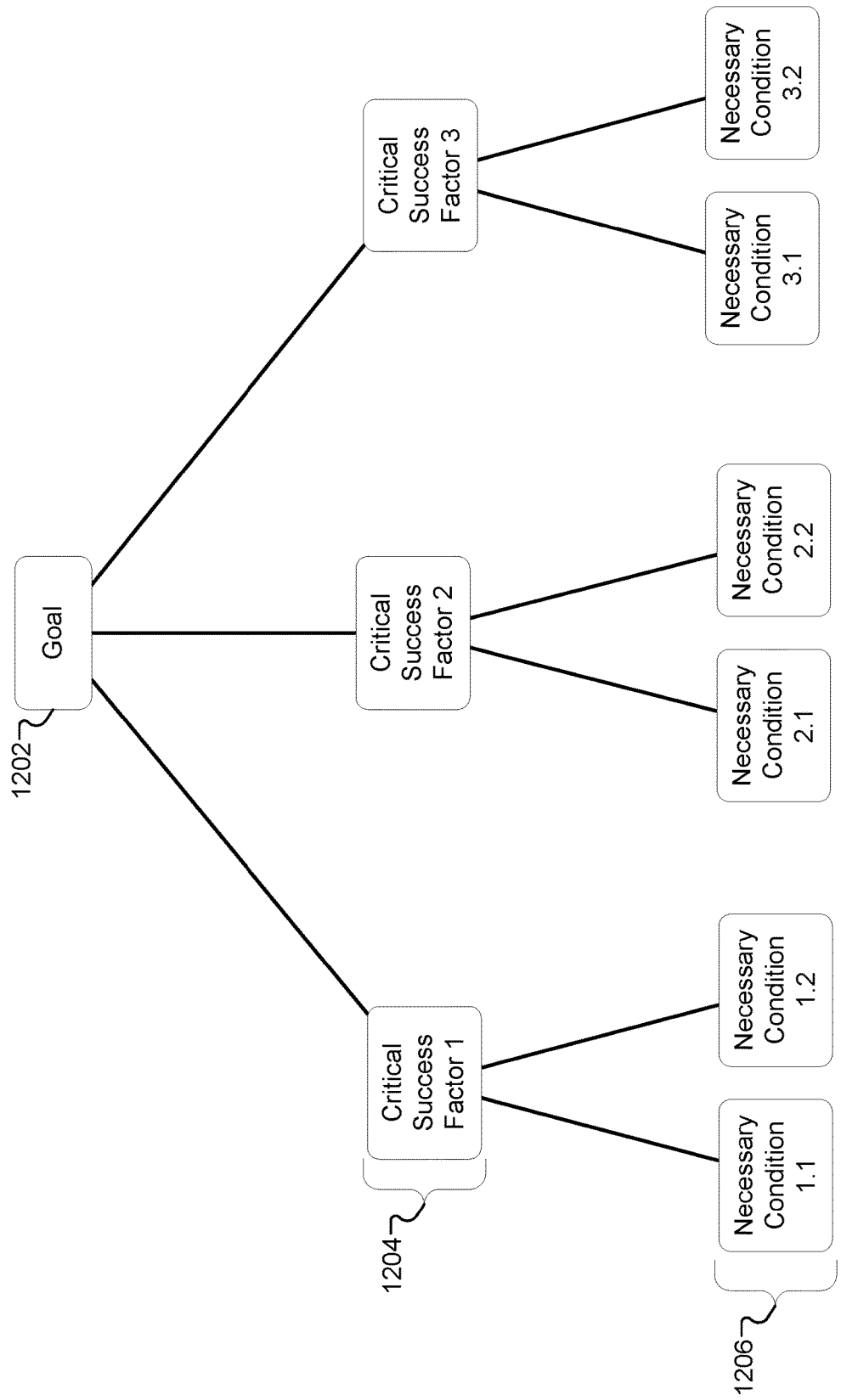
FIG. 12 illustrates a data structure representing a goal-oriented process that can be modeled by the software agent, according to some embodiments.

FIG. 12 illustrates a data structure representing a goal-oriented process that can be modeled by the software agent, according to some embodiments. An objective of some embodiments is to model the operation such that the operation of the agent process makes decisions in the same way that a human would make decisions regarding how the query should be selected and presented to the user. As described above, the user may have certain goals, and the operator may also have certain goals. These goals can be provided to the agent process either explicitly or implicitly. Once goals are ascertained and made part of the context that is stored for each user communication session, they can be used by the software agent to drive the conversation with the user accordingly.

In the software, a goal 1202 can be defined with respect to its critical success factors 1204. The critical success factors 1202 may indicate things that need to be accomplished by the software in order for the goal 1202 to be met. The third level of the data structure includes necessary conditions 1206, or conditions that need to be satisfied for each of the critical success factors 1204. These conditions and factors can be implemented in the software of the agent process using the models described above to identify the overall process flow (BPMN), to identify specific actions that need to be taken based on the information that is missing (CMMN), and to execute specific process flows to obtain that information (DMN) as described above. The elements of FIG. 12 can be expressed in the BPMN/CMMN/DMN models using business logic. For example, the BPMN/CMMN process logic may control who, what, how, when, where, etc., actions need to be taken, while the decision logic expressed in the DMN models may control the conditional execution of these processes.

Figure 13:
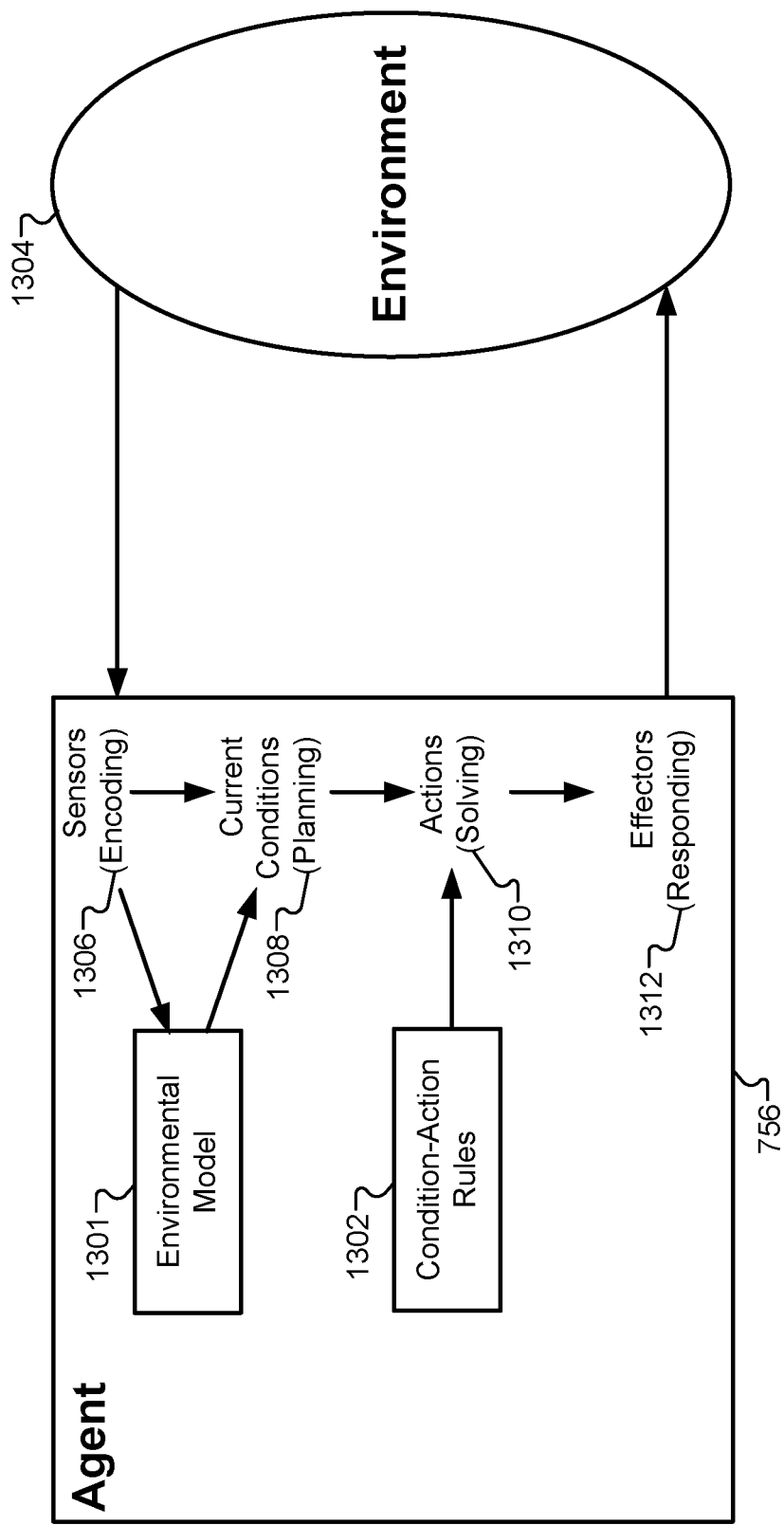
FIG. 13 illustrates a diagram of how the agent process can interact with a generic environment, according to some embodiments.

FIG. 13 illustrates a diagram of how the agent process 756 can interact with a generic environment 1304, according to some embodiments. The environment 1304 can generically represent any interactive situation that may include a conversation governed by the agent process 756. In the examples described herein, the environment 1304 may include the environment depicted in FIG. 7A to populate a client data set based on interactions between a user and an operator. This diagram illustrates a model of an agent process 756 that is responsive to the surrounding environment 1304. For example, the agent process 756 can analyze the environment of the conversation between the user and the operator, as well as the current state of the context from the client data set, and respond such that the environment can be changed to conform to the goals recognized by the agent process 756.

The agent can begin by including characteristics of the environment 1304 using one or more sensors. In simple embodiments, the sensors may include input devices of the terminal device, such as keyboards, microphones, touch screens, and so forth. The encoding step 1306 aims to accurately generate a description of the environment 1304, in an internal environmental model 1301, for the agent process 756. Next, the agent process 756 can assess a current state of the environment 1304, through 1301 and evaluate the current conditions relative to the goals that were previously recognized by the agent process 756. For example, a goal may be to complete a client data set. The agent process 756 can evaluate current conditions, including a state of the conversation between the user and the operator, the context of the conversation, and any missing data fields in the client data set. Other goals may be more specific, such as completing the client data set for a product that will lower a monthly payment for the user. Thus, the agent process 756 can also evaluate products assigned to the client and for which the client may be eligible based on received data values. Overall, the planning step 1308 can be used to compare the current conditions of the environment to a target set of conditions derived from the received goals. Any differences can be identified by the planning step 1308.

Based on the differences identified in the planning step 1308, the solving step 1310 can be used to determine a set of actions that can be executed by the agent process 756 to help conform the conditions of the environment 1304 to the target conditions consistent with the received goals. As described in greater detail below, these actions can be selected from a table of condition-action rules 1302 where specific conditions are associated with specific rules. For example, specific query sequences can be selected from the table to be provided to the user in order to remedy deficiencies in the client data set. The responding step 1312 can execute the actions in the solving step 1310 by presenting the querying sequences to the user, selecting a new product, retrieving information from a third-party data source, and/or the like.

FIG. 13 illustrates a cognitive automation process that is "intelligent" in that it actively adjusts system execution in order to achieve the desired outcomes and goals while still operating within the constraints of policies, regulations, rules, and models. The active adjustment can include a feedback loop and machine learning engine as described above. Specifically, if actions are taken that do not have the desired effect on the environment 1304, the condition-action rules 1302 can be updated to ensure that the best solutions are executed in the future. The CMMN model simulates the intelligent looping of this diagram to fill in missing data points until all goals are achieved.

Figure 14:
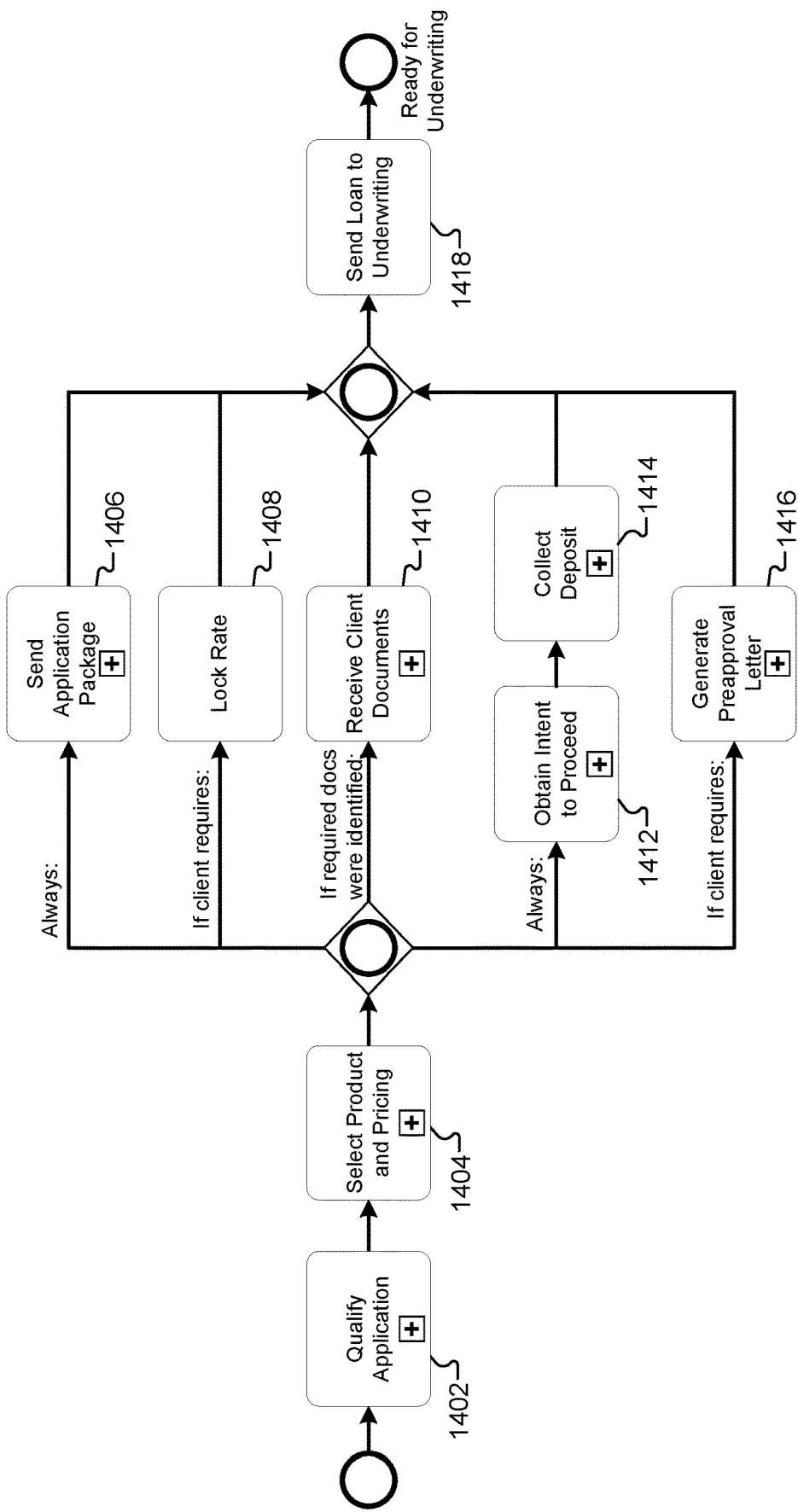
FIG. 14 illustrates a top-level BPMN process flow for an application process. Each of the steps in this model include a number of sub processes that can be executed by a CMMN model.

FIG. 14 illustrates a top-level BPMN process flow for an application process. Each of the steps in this model include a number of sub processes that may be represented by a CMMN model. During this process, the application can be qualified (1402) and a product/pricing can be selected (1404). In each case, the process can obtain consent from the user to proceed (1412), collect a deposit (1414), and the application package can then be sent for approval (1406). If required by the user, the process can lock a rate (1408) and generate a preapproval letter (1416). If required documents were determined to be missing, the process can retrieve the client documents (1410). After each of these steps is completed, the application can be sent for approval (1418). It should be noted that this top-level BPMN process flow represents only one example model for the agent process. Other models and process flows adapted to different situations may depend on the particular embodiments.

Figure 15:
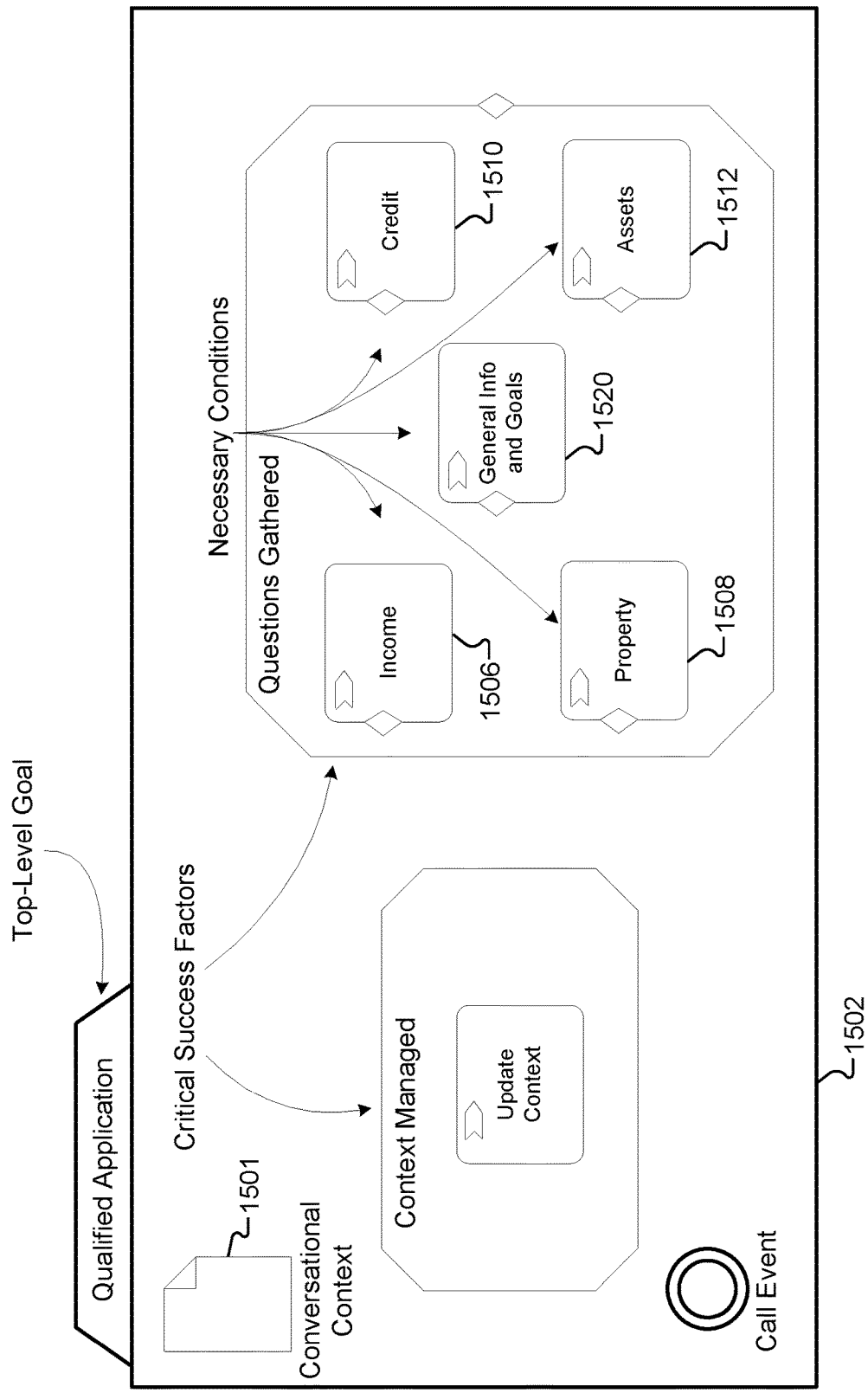
FIG. 15 illustrates an example of a CMMN model for the "qualify application" step of FIG. 14.

Each of the process steps in FIG. 14 can be expanded to reveal a number of sub processes. FIG. 15 illustrates an example of a CMMN model for the "qualify application" step (1402) of FIG. 14. This CMMN modeling implements the encoding, planning, solving, and responding feedback loop of FIG. 13. Specifically, the overarching goal is represented by the case file 1502, and the critical success factors are represented by the stages within in the case file. The necessary conditions are encoded as specific processes that can be enabled/disabled through top-level decisions as indicated by the diamond icons on each of the processes. The necessary conditions can be aligned with the general information and goals collected through the execution of process 1520 and the conversational context 1501. Again, each of the processes 1506, 1508, 1510, 1512 can be expanded to reveal additional underlying sub processes.

Figure 16:
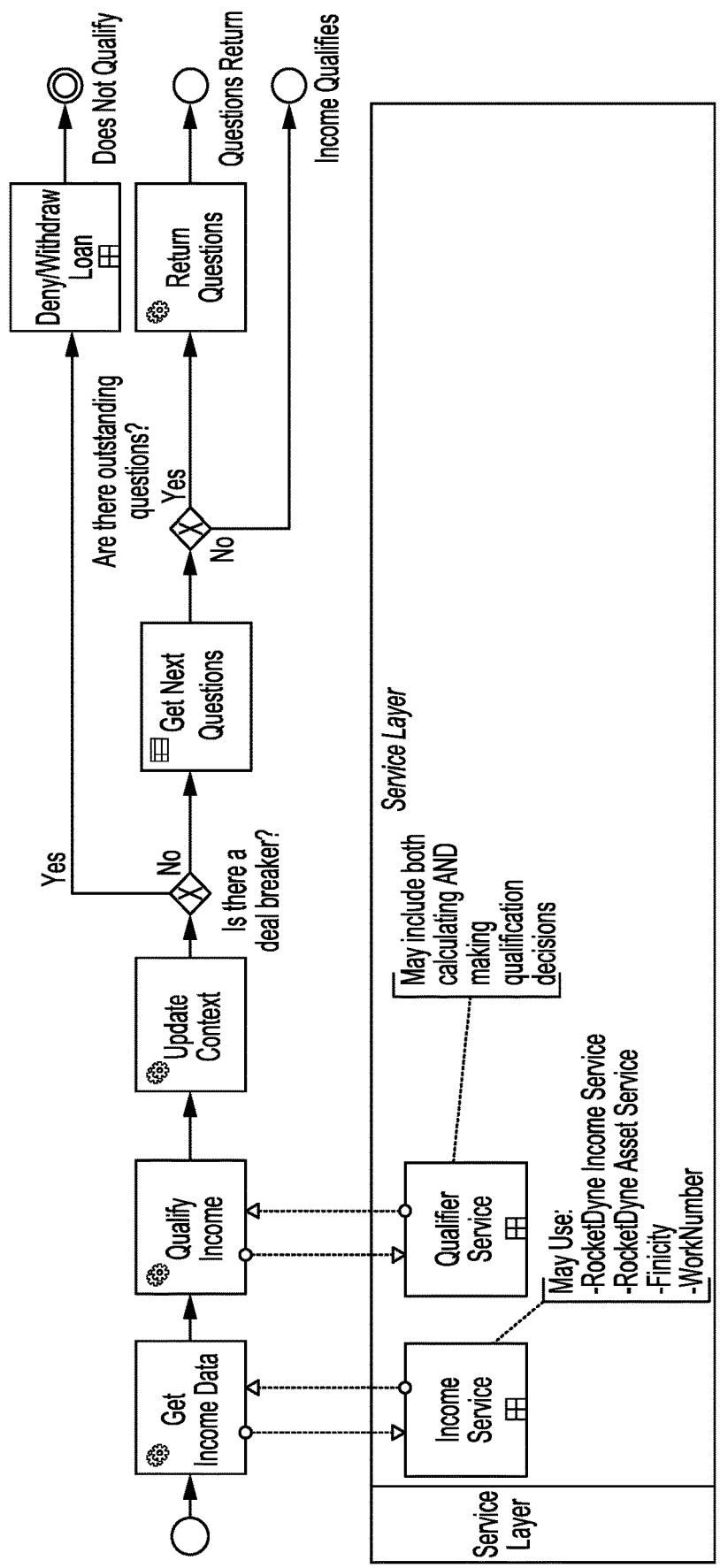
FIG. 16 illustrates a detailed dimension flow of the income process of FIG. 15, according to some embodiments.

FIG. 16 illustrates a detailed dimension flow of the income process 1506 of FIG. 15, according to some embodiments. After leaving the relatively unstructured CMMN model of FIG. 15, this process flow reverts back into a structured data flow. This process may execute sequenced steps that retrieve income data from an income service, qualify the income through an income qualification service, and update the context of the conversation. This process may also include a determination as to whether the user is eligible for a product that satisfies a top-level goal based on information currently known. Based on the outcome of this determination, additional questions can be determined from corresponding decision tables. These questions can then be returned back to the CMMN model discussed above and presented to the user.

Figure 17:
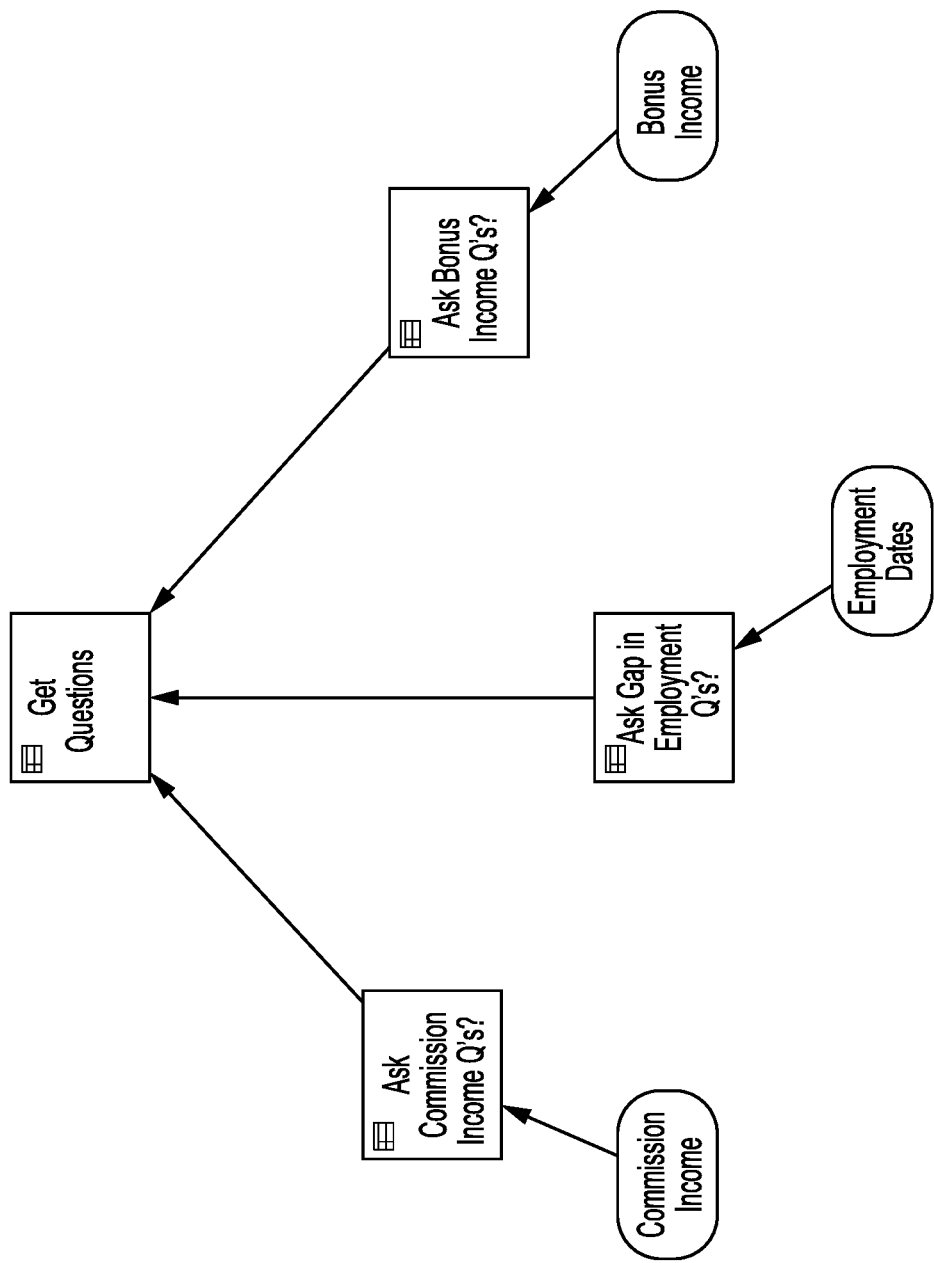
FIG. 17 illustrates a decision tree of a DMN model for retrieving additional queries, according to some embodiments.

FIG. 17 illustrates a Decision Requirement Diagram (DRD) in DMN for retrieving additional queries, according to some embodiments. Each of the nodes in the decision network represents one or more queries that can be submitted to the user and the type of response expected to be received. FIG. 18 illustrates an encoding of a decision tree in a tabular format with specific questions/question sequences along with possible results. FIG. 19 illustrates a partial JSON encoding for the questions in decision tree format.

Figure 20A:
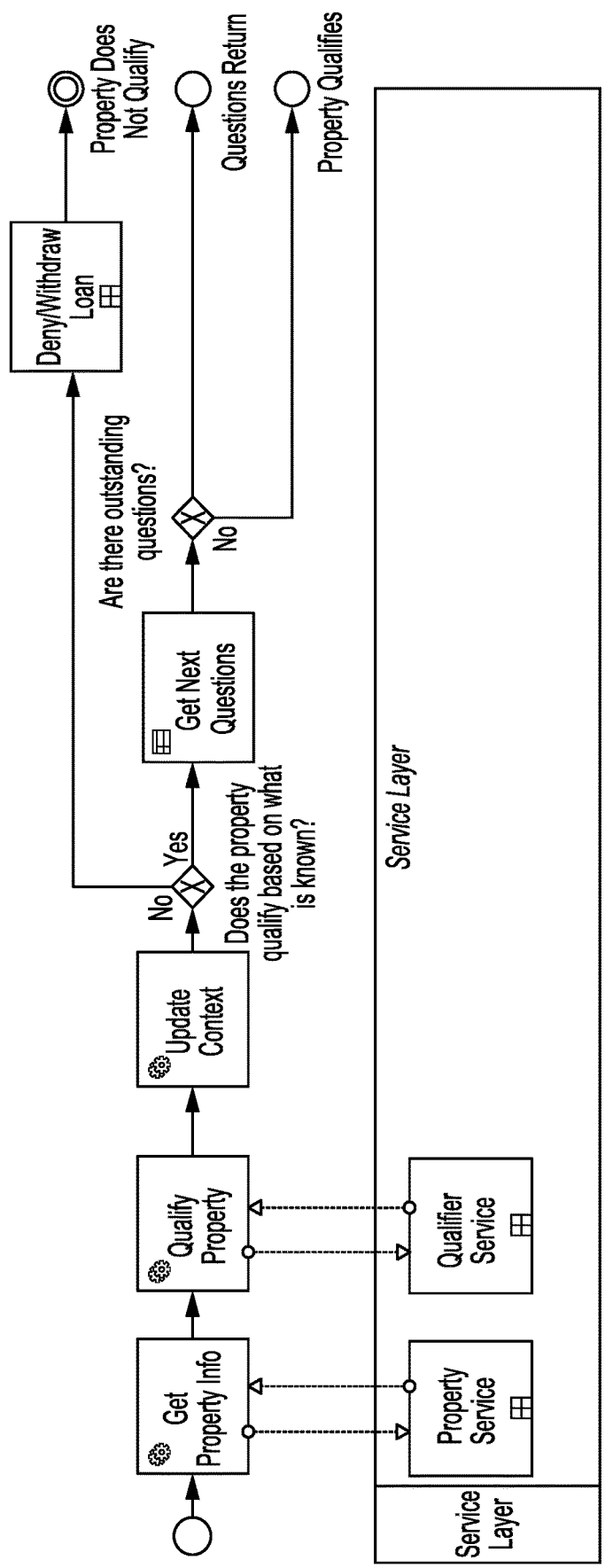
FIG. 20A illustrates a process flow of the property dimension.
Figure 20B:
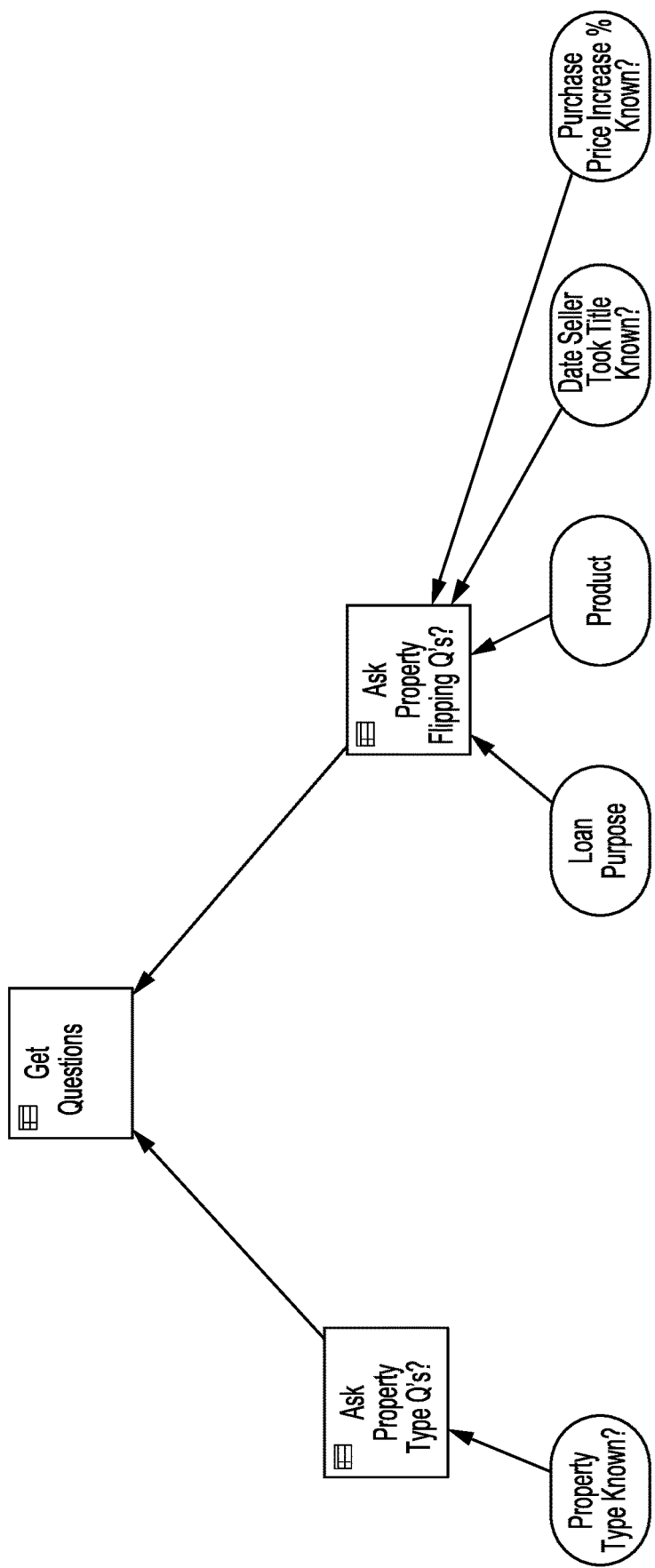
FIG. 20B illustrates a corresponding decision tree for the property dimension.
Figure 21:
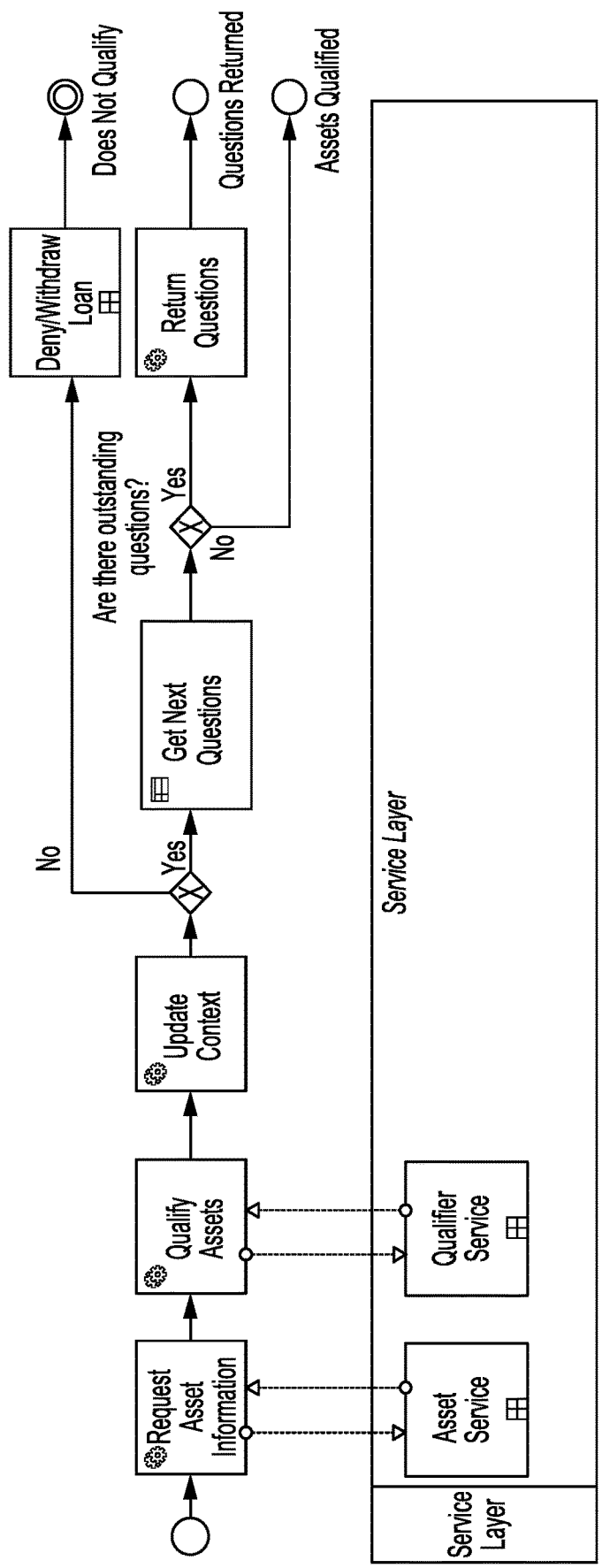
FIG. 21 illustrates a process flow of the asset dimension.
Figure 22:
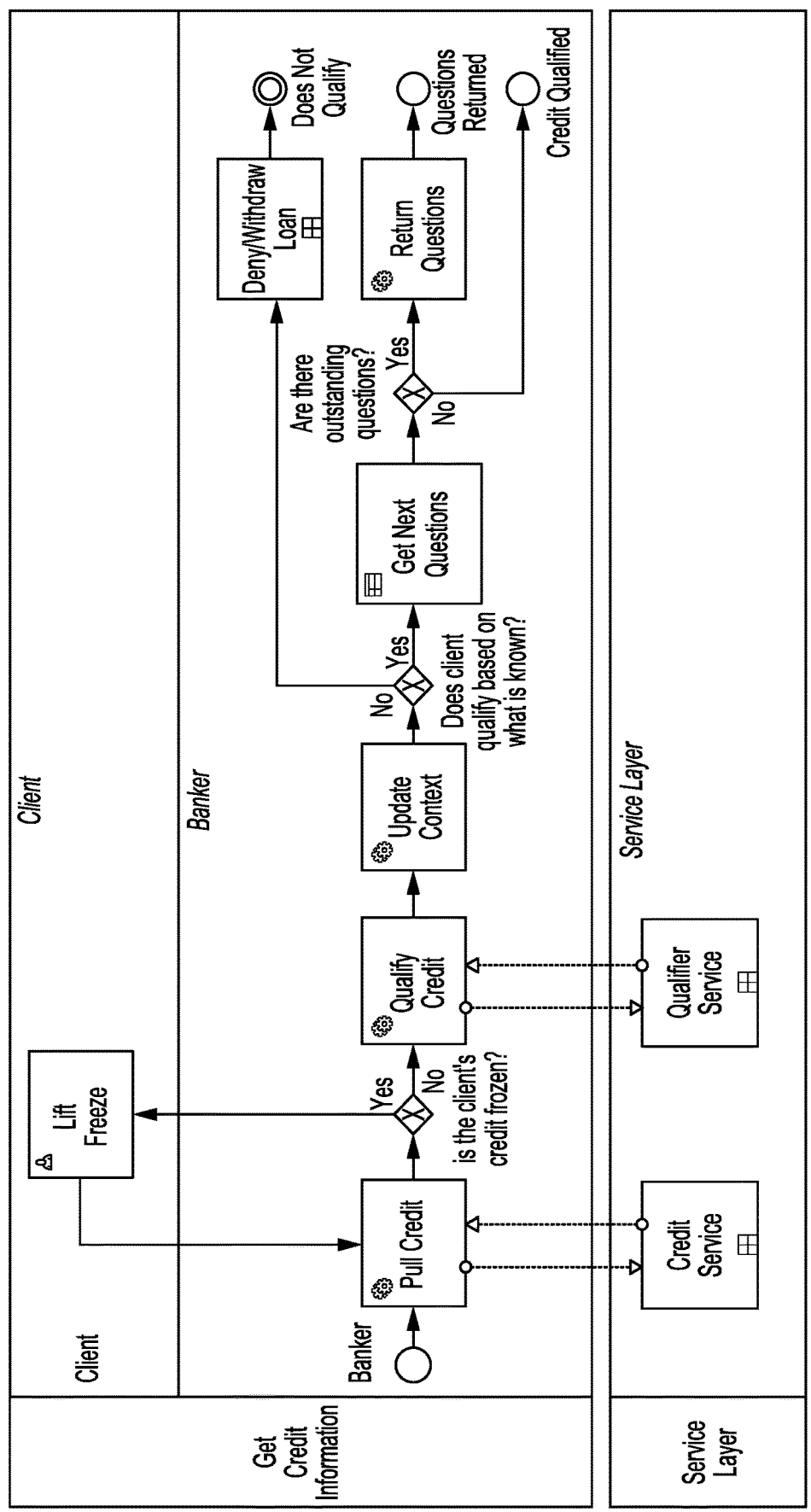
FIG. 22 illustrates a process flow of the credit dimension.
Figure 23:
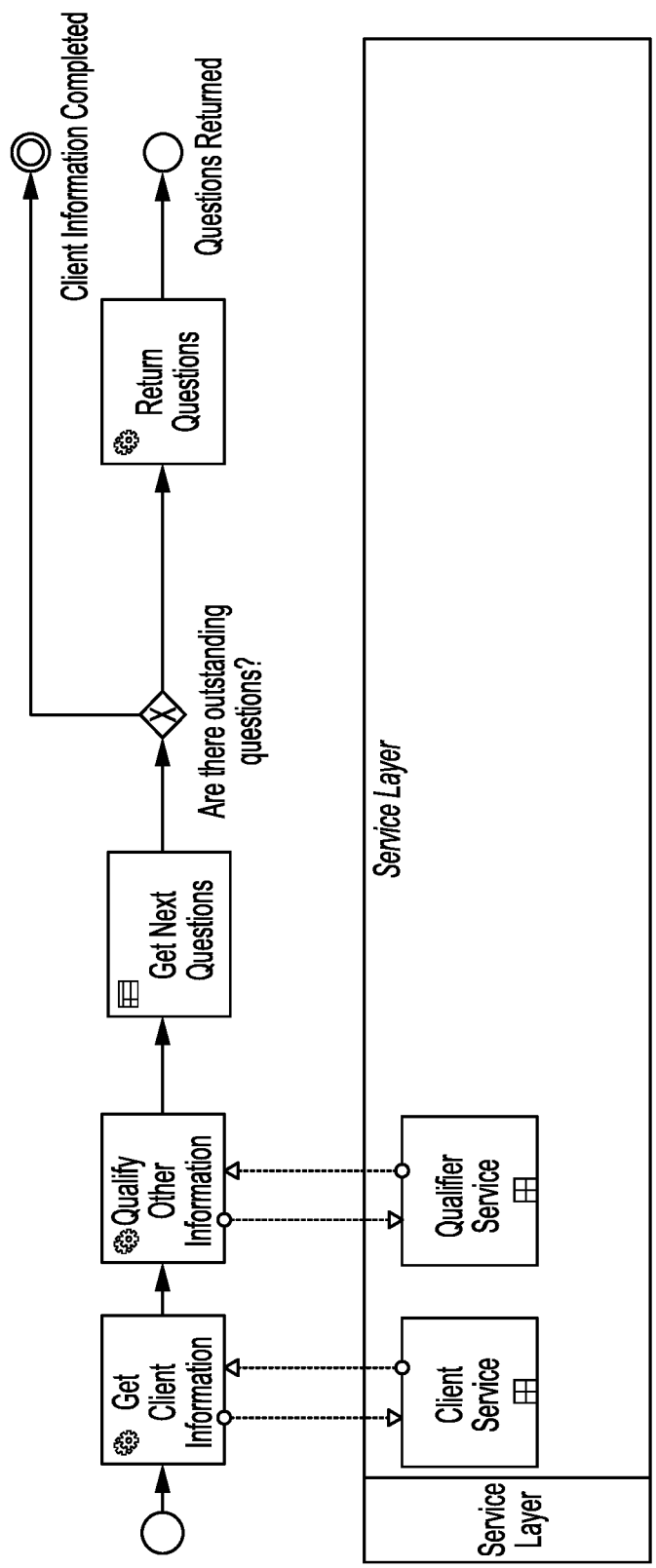
FIG. 23 illustrates a process flow for obtaining goals and other information from the user.
Figure 24:
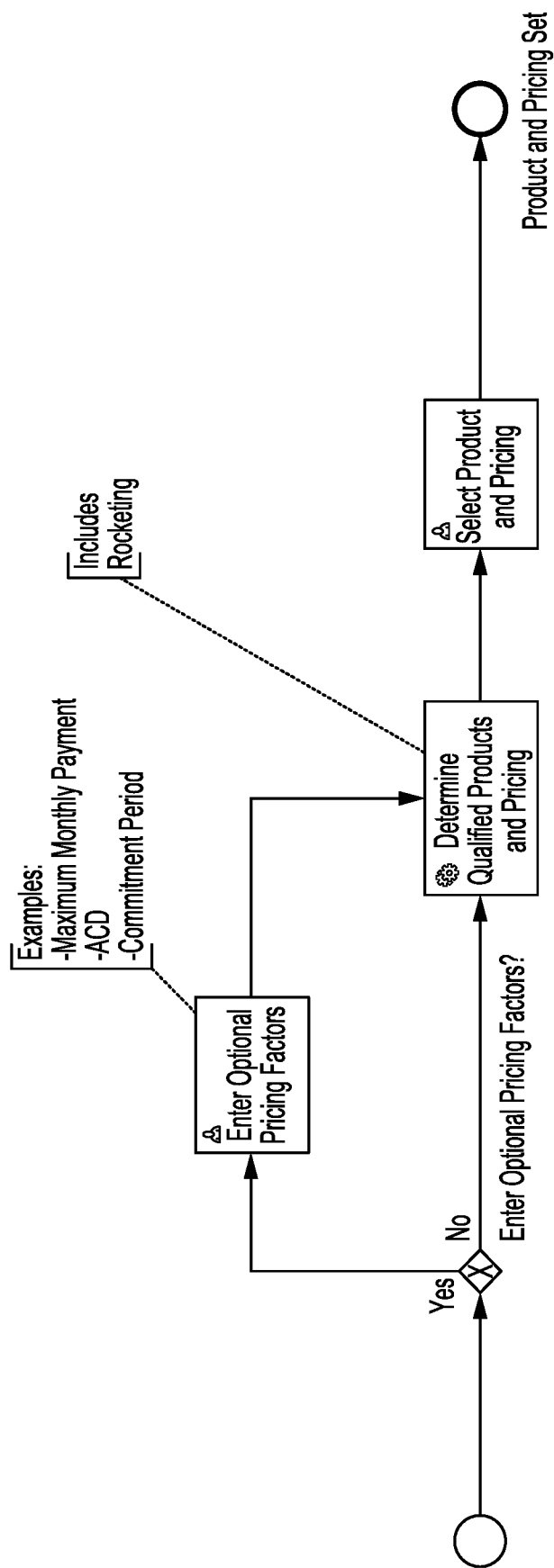
FIG. 24 illustrates a process flow for selecting product and pricing.

Turning back briefly to FIG. 15, each of the other IPAC dimensions may have corresponding structure process flows and decision networks for retrieving additional queries. FIG. 20A illustrates a process flow of the property dimension, and FIG. 20B illustrates a corresponding decision network for the property dimension. FIG. 21 illustrates a process flow of the asset dimension, and FIG. 22 illustrates a process flow of the credit dimension. FIG. 23 illustrates a process flow for obtaining goals and other information from the user, and FIG. 24 illustrates a process flow for selecting product and pricing. The questions, prerequisites, and operations for each of these figures are illustrated in detail in the figures themselves.

Server Computer System

Figure 25:
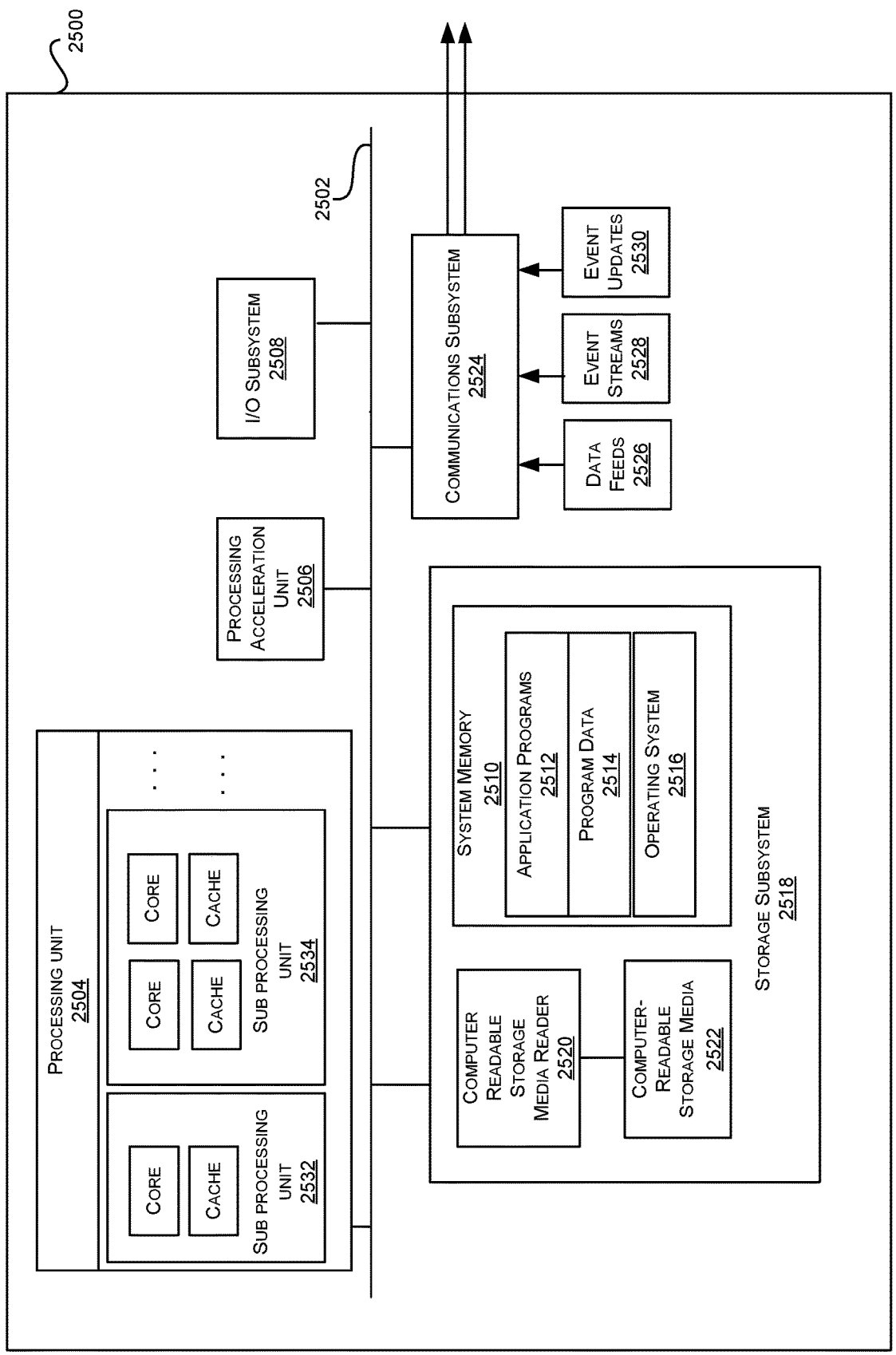
FIG. 25 illustrates a server computer system.

FIG. 25 illustrates a server computer system 754 described above. As shown in the figure, computer system 2500 includes a processing unit 2504 that communicates with a number of peripheral subsystems via a bus subsystem 2502. These peripheral subsystems may include a processing acceleration unit 2506, an I/O subsystem 2508, a storage subsystem 2518 and a communications subsystem 2524. Storage subsystem 2518 includes tangible computer-readable storage media 2522 and a system memory 2510.

Bus subsystem 2502 provides a mechanism for letting the various components and subsystems of computer system 2500 communicate with each other as intended. Although bus subsystem 2502 is shown schematically as a single bus, alternative embodiments of the bus subsystem may utilize multiple buses. Bus subsystem 2502 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 2504, which can be implemented as one or more integrated circuits (e.g., a conventional microprocessor or microcontroller), controls the operation of computer system 2500. One or more processors may be included in processing unit 2504. These processors may include single core or multicore processors. In certain embodiments, processing unit 2504 may be implemented as one or more independent processing units 2532 and/or 2534 with single or multicore processors included in each processing unit. In other embodiments, processing unit 2504 may also be implemented as a quad-core processing unit formed by integrating two dual-core processors into a single chip.

In various embodiments, processing unit 2504 can execute a variety of programs in response to program code and can maintain multiple concurrently executing programs or processes. At any given time, some or all of the program code to be executed can be resident in processor(s) 2504 and/or in storage subsystem 2518. Through suitable programming, processor(s) 2504 can provide various functionalities described above. Computer system 2500 may additionally include a processing acceleration unit 2506, which can include a digital signal processor (DSP), a special-purpose processor, and/or the like.

I/O subsystem 2508 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 2500 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 2500 may comprise a storage subsystem 2518 that comprises software elements, shown as being currently located within a system memory 2510. System memory 2510 may store program instructions that are loadable and executable on processing unit 2504, as well as data generated during the execution of these programs.

Depending on the configuration and type of computer system 2500, system memory 2510 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 2504. In some implementations, system memory 2510 may include multiple different types of memory, such as static random access memory (SRAM) or dynamic random access memory (DRAM). In some implementations, a basic input/output system (BIOS), containing the basic routines that help to transfer information between elements within computer system 2500, such as during start-up, may typically be stored in the ROM. By way of example, and not limitation, system memory 2510 also illustrates application programs 2512, which may include client applications, Web browsers, mid-tier applications, relational database management systems (RDBMS), etc., program data 2514, and an operating system 2516. By way of example, operating system 2516 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 2518 may also provide a tangible computer-readable storage medium for storing the basic programming and data constructs that provide the functionality of some embodiments. Software (programs, code modules, instructions) that when executed by a processor provide the functionality described above may be stored in storage subsystem 2518. These software modules or instructions may be executed by processing unit 2504. Storage subsystem 2518 may also provide a repository for storing data used in accordance with the present invention.

Storage subsystem 2500 may also include a computer-readable storage media reader 2520 that can further be connected to computer-readable storage media 2522. Together and, optionally, in combination with system memory 2510, computer-readable storage media 2522 may comprehensively represent remote, local, fixed, and/or removable storage devices plus storage media for temporarily and/or more permanently containing, storing, transmitting, and retrieving computer-readable information.

Computer-readable storage media 2522 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 2500.

By way of example, computer-readable storage media 2522 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 2522 may include, but is not limited to, Zip® drives, flash memory cards, universal serial bus (USB) flash drives, secure digital (SD) cards, DVD disks, digital video tape, and the like. Computer-readable storage media 2522 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 2500.

Communications subsystem 2524 provides an interface to other computer systems and networks. Communications subsystem 2524 serves as an interface for receiving data from and transmitting data to other systems from computer system 2500. For example, communications subsystem 2524 may enable computer system 2500 to connect to one or more devices via the Internet. In some embodiments communications subsystem 2524 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 2524 can provide wired network connectivity (e.g., Ethernet) in addition to or instead of a wireless interface.

In some embodiments, communications subsystem 2524 may also receive input communication in the form of structured and/or unstructured data feeds 2526, event streams 2528, event updates 2530, and the like on behalf of one or more users who may use computer system 2500.

By way of example, communications subsystem 2524 may be configured to receive data feeds 2526 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 2524 may also be configured to receive data in the form of continuous data streams, which may include event streams 2528 of real-time events and/or event updates 2530, that may be continuous or unbounded in nature with no explicit end. Examples of applications that generate continuous data may include, for example, sensor data applications, network performance measuring tools (e.g. network monitoring and traffic management applications), clickstream analysis tools, automobile traffic monitoring, and the like.

Communications subsystem 2524 may also be configured to output the structured and/or unstructured data feeds 2526, event streams 2528, event updates 2530, and the like to one or more databases that may be in communication with one or more streaming data source computers coupled to computer system 2500.

Computer system 2500 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 2500 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing description, for the purposes of explanation, numerous specific details were set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The foregoing description provides exemplary embodiments only, and is not intended to limit the scope, applicability, or configuration of the disclosure. Rather, the foregoing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the foregoing description to provide a thorough understanding of the embodiments. However, it will be understood by one of ordinary skill in the art that the embodiments may be practiced without these specific details. For example, circuits, systems, networks, processes, and other components may have been shown as components in block diagram form in order not to obscure the embodiments in unnecessary detail. In other instances, well-known circuits, processes, algorithms, structures, and techniques may have been shown without unnecessary detail in order to avoid obscuring the embodiments.

Also, it is noted that individual embodiments may have been described as a process which is depicted as a flowchart, a flow diagram, a data flow diagram, a structure diagram, or a block diagram. Although a flowchart may have described the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to portable or fixed storage devices, optical storage devices, wireless channels and various other mediums capable of storing, containing, or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method of populating a data set, the method comprising:
   generating a plurality of models that model the behavior of an agent process, wherein the plurality of models comprises:
     a first model;
     a second model; and
     a third model;
   using the plurality of models to generate one or more requests for one or more external data sources, wherein the one or more requests request information that is missing from the data set that is associated with a first user;
   using the plurality of models to select a plurality of queries from a data store of predefined queries, wherein the plurality of queries are selected by the plurality of models to request information from the first user that is missing from the data set;
   populating at least a portion of the data set using information received in response to:
     the one or more requests for the one or more external data sources; and
     the plurality of queries.

2. The method of claim 1, further comprising:
   storing a history of queries and information received in response to the queries for users other than the first user;
   identifying one or more patterns from the history of queries and information received in response to the queries; and
   using the one or more patterns to select the plurality of queries from the data store of predefined queries.

3. The method of claim 2, further comprising:
   altering a decision logic layer of the plurality of models based on the one or more patterns.

4. The method of claim 2, further comprising:
   clustering users based on whether the information received in response to the queries was accurate.

5. The method of claim 1, wherein the plurality of queries are selected based on a role of a second user.

6. The method of claim 1, further comprising:
   determining, by the plurality of models, whether information received in response to the plurality of queries should replace information received in response to the one or more requests for the one or more external data sources in the data set.

7. The method of claim 1, wherein the plurality of queries are selected based on an objective received from the first user.

8. The method of claim 1, wherein the first model comprises a Business Process Modeling Notation (BPMN) model.

9. The method of claim 1, wherein the second model comprises a Case Management Model and Notation (CMMN) model.

10. The method of claim 1, wherein the third model comprises a Decision Model and Notation (DMN) model.

11. A system comprising:
    one or more processors; and
    one or more memory devices comprising instructions that, when executed by the one or more processors, cause the one or more processors to perform operations comprising:
      generating a plurality of models that model the behavior of an agent process, wherein the plurality of models comprises:
        a first model;
        a second model; and
        a third model;
      using the plurality of models to generate one or more requests for one or more external data sources, wherein the one or more requests request information that is missing from the data set that is associated with a first user;
      using the plurality of models to select a plurality of queries from a data store of predefined queries, wherein the plurality of queries are selected by the plurality of models to request information from the first user that is missing from the data set;
      populating at least a portion of the data set using information received in response to:
        the one or more requests for the one or more external data sources; and
        the plurality of queries.

12. The system of claim 11, further comprising a conversational API that is configured to manage a history of query sets and corresponding responses in one or more linked communication sessions.

13. The system of claim 11, further comprising a content API that is configured to receive topic codes and return query sets corresponding to each of the topic codes.

14. The system of claim 11, the operations further comprising:

clustering users based on whether the information received in response to the queries was accurate.

15. The system of claim 11, wherein the plurality of queries are selected based on a role of a second user.

16. The system of claim 11, the operations further comprising:
   determining, by the plurality of models, whether information received in response to the plurality of queries should replace information received in response to the one or more requests for the one or more external data sources in the data set.

17. The system of claim 11, wherein the plurality of queries are selected based on an objective received from the first user.

18. A non-transitory, computer-readable medium comprising instructions that, when executed by one or more processors, cause the one or more processors to perform operations comprising:
   generating a plurality of models that model the behavior of an agent process, wherein the plurality of models comprises:
      a first model;
      a second model; and
      a third model;
   using the plurality of models to generate one or more requests for one or more external data sources, wherein the one or more requests request information that is missing from the data set that is associated with a first user;
   using the plurality of models to select a plurality of queries from a data store of predefined queries, wherein the plurality of queries are selected by the plurality of models to request information from the first user that is missing from the data set;
   populating at least a portion of the data set using information received in response to:
      the one or more requests for the one or more external data sources; and
      the plurality of queries.

19. The non-transitory, computer-readable medium of claim 18, the operations further comprising:
   storing a history of queries and information received in response to the queries for users other than the first user;
   identifying one or more patterns from the history of queries and information received in response to the queries; and
   using the one or more patterns to select the plurality of queries from the data store of predefined queries.

20. The non-transitory, computer-readable medium of claim 18, the operations further comprising:
   determining, by the plurality of models, whether information received in response to the plurality of queries should replace information received in response to the one or more requests for the one or more external data sources in the data set.

* * * * *